United States Patent
Hwang et al.

(10) Patent No.: US 9,305,593 B2
(45) Date of Patent: *Apr. 5, 2016

(54) SKEW-TOLERANT MULTIPLE-READER ARRAY IN ARRAY-READER BASED MAGNETIC RECORDING

(71) Applicant: Avago Technologies General IP (Singapore) Pte. Ltd., Singapore (SG)

(72) Inventors: Eui Seok Hwang, Palo Alto, CA (US); George Mathew, San Jose, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 14/446,012

(22) Filed: Jul. 29, 2014

(65) Prior Publication Data

US 2016/0035384 A1     Feb. 4, 2016

(51) Int. Cl.
  *G11B 21/02*   (2006.01)
  *G11B 20/10*   (2006.01)
  *G11B 5/56*    (2006.01)

(52) U.S. Cl.
  CPC ............ *G11B 20/10388* (2013.01); *G11B 5/56* (2013.01); *G11B 20/10037* (2013.01); *G11B 20/10046* (2013.01)

(58) Field of Classification Search
  None
  See application file for complete search history.

(56) References Cited

U.S. PATENT DOCUMENTS

| | | | |
|---|---|---|---|
| 4,462,053 A * | 7/1984 | Lum et al. | 360/78.06 |
| 5,636,244 A | 6/1997 | Goodson | |
| 6,337,878 B1 | 1/2002 | Endres | |
| 6,418,164 B1 | 7/2002 | Endres | |
| 8,102,960 B2 | 1/2012 | Ran | |
| 8,139,301 B1 * | 3/2012 | Li et al. | 360/39 |
| 8,175,201 B2 | 5/2012 | Mathew | |
| 8,532,504 B2 | 9/2013 | Wagner | |
| 8,599,508 B1 * | 12/2013 | Burd | 360/39 |
| 8,861,114 B1 * | 10/2014 | Burd | 360/45 |
| 8,902,536 B1 * | 12/2014 | Hwang et al. | 360/75 |
| 8,922,947 B2 * | 12/2014 | Erden et al. | 360/121 |
| 8,947,812 B1 * | 2/2015 | Wang | 360/53 |
| 8,988,802 B1 * | 3/2015 | Erden et al. | 360/39 |
| 8,988,812 B1 * | 3/2015 | Brunnett et al. | 360/55 |

(Continued)

OTHER PUBLICATIONS

George Mathew et al., "Capacity Advantage of Array-Reader Based Magnetic Recording for Next Generation Hard Disk Drives," Digests of the 24th Magnetic Recording Conference TMRC 2013, Aug. 20-22, 2013, pp. i-ii, 1, and 58-59.

(Continued)

*Primary Examiner* — K. Wong

(57) ABSTRACT

A method for enhancing read performance in an ARMR system includes: obtaining CTS information for a plurality of readers in a multi-reader head of the ARMR system, the CTS information defining a relationship between skew angle and CTS between respective combinations of subsets of the readers; determining, as a function of the CTS information, a subset of the readers which provides enhanced read performance among the readers for each of a plurality of skew angles; assigning a weight value to each of a plurality of read signals generated by a corresponding one of the readers for each of the skew angles, the weight value being indicative of a performance of the corresponding one of the readers relative to one another; and decoding information read from at least one target track of a magnetic storage medium being read as a function of the read signals and corresponding weight values.

23 Claims, 14 Drawing Sheets

(56) References Cited

U.S. PATENT DOCUMENTS

| | | | |
|---|---|---|---|
| 9,013,821 B1 * | 4/2015 | Chen | 360/65 |
| 9,013,824 B1 * | 4/2015 | Guo et al. | 360/75 |
| 9,025,267 B1 * | 5/2015 | Wang et al. | 360/39 |
| 2006/0045176 A1 | 3/2006 | Moughabghab | |
| 2014/0016688 A1 | 1/2014 | Venkataramani | |
| 2014/0086298 A1 | 3/2014 | Lu | |
| 2014/0105266 A1 | 4/2014 | Xia | |

OTHER PUBLICATIONS

Nuno Miguel De Figueiredo Garrido, "Available Techniques for Magnetic Hard Disk Drive Read Channel Equalization," NM de Figueiredo Garrido, Jul. 8, 2013, pp. 1-13.

Chan Kheong Sann, "Channel Models and Detectors for Two-Dimensional Magnetic Recording (TDMR)," IEEE Trans. Magn., vol. 46, No. 3, pp. 804-811, 2010.

* cited by examiner

SKEW-TOLERANT MULTIPLE-READER ARRAY IN ARRAY-READER BASED MAGNETIC RECORDING

FIELD OF INVENTION

The present invention relates generally to electrical and electronic circuitry, and more particularly relates to magnetic recording.

BACKGROUND

The magnetic disk drive recording industry continues to pursue advances in technology that will sustain enhancements in recording density in a cost-effective manner. Two approaches currently under investigation are bit patterned media recording (BPMR) and heat-assisted magnetic recording (HAMR). An objective of these approaches is to overcome challenges posed by the super-paramagnetic limit that imposes a trade-off among three fundamentally competing recording parameters: media signal-to-noise ratio (SNR), writability and thermal stability. BPMR and HAMR, however, require modifications to the media and heads which significantly increase costs. Another technology, two-dimensional magnetic recording (TDMR), which uses conventional media and a new multiple-head configuration, relies on powerful signal processing in an attempt to achieve a theoretical one bit-per-grain recording density.

As a practical near-term milestone, array-reader based magnetic recording (ARMR) has been proposed to increase areal density with an array-reader and associated signal processing.

SUMMARY

In accordance with an embodiment of the invention, a method for enhancing read performance in a multiple-reader ARMR system includes: obtaining cross-track separation (CTS) information for a plurality of readers in a multi-reader head of the ARMR system, the CTS information defining a relationship between skew angle and CTS between respective combinations of subsets of the readers; determining, as a function of the CTS information, a subset of the readers which provides enhanced read performance among the readers for each of a plurality of skew angles; assigning a weight value to each of a plurality of read signals generated by a corresponding one of the readers for each of the skew angles, the weight value assigned to each of the read signals being indicative of a performance of the corresponding one of the readers relative to one another; and decoding information read from at least one target track of a magnetic storage medium being read as a function of the read signals and corresponding weight values. Other embodiments of the invention include, but are not limited to, being manifest as an apparatus for enhancing read performance in an ARMR system, and an integrated circuit including at least one apparatus for enhancing read performance. Additional and/or other embodiments of the invention are described in the following written description, including the claims, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

Figure 1:
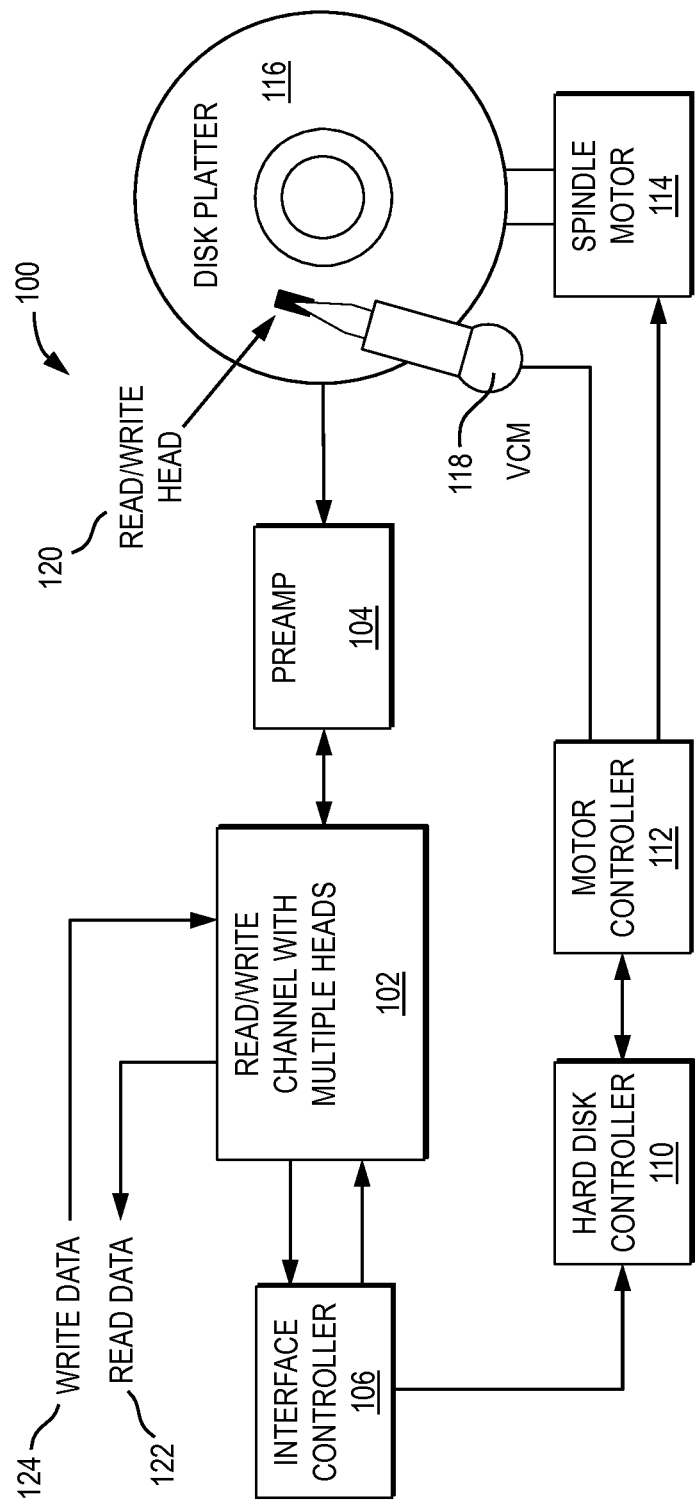
FIG. 1 is a block diagram depicting at least a portion of a magnetic disk drive storage system in which one or more embodiments of the invention are employed.

It is to be appreciated that the drawings described herein are presented for illustrative purposes only. Moreover, common but well-understood elements and/or features that may be useful or necessary in a commercially feasible embodiment may not be shown in order to facilitate a less hindered view of the illustrated embodiments.

WRITTEN DESCRIPTION

Embodiments of the invention will be described herein in the context of illustrative array-reader based magnetic recording (ARMR) systems for use, for example, in a data storage application. It should be understood, however, that embodiments of the invention are not limited to these or any other particular ARMR arrangements. Rather, embodiments of the invention are more broadly applicable to techniques for improving read performance of a magnetic storage device. In this regard, embodiments of the invention provide an apparatus and methodology for beneficially mitigating the impact of skew in an ARMR system. More particularly, one or more embodiments of the invention utilize an array reader including a plurality of readers, the number of readers being greater than the number of target tracks being read at any given time (e.g., in a MISO embodiment, one target track is read; in a MIMO embodiment, multiple target tracks are read). Due to varying skew angles experienced by the array reader, not all of the multiple readers can always be aligned to a target track of interest. In accordance with one or more embodiments of the invention, the readers are carefully configured such that each target track is aligned with at least one corresponding reader for a given zone being read. In this manner, embodiments of the invention provide enhanced read performance to thereby improve skew tolerance in the ARMR system.

More particularly, according to at least one illustrative embodiment, when the readers are spread over the tracks, the readers can be assigned separately as follows: a first subset of the readers (primary readers) is selected, based at least in part on an amplitude of the signal obtained therefrom for a given zone being read, to directly enhance the signal from a corresponding target track and to increase signal-to-noise ratio (SNR); a second subset of readers (secondary readers) not directly used in the forward processing (e.g., in enhancing the signal from the target track(s)), in accordance with one or more embodiments, is used to enhance an accuracy of the output result, such as, for example, by suppressing inter-track interference (ITI) and implicitly increasing the SNR.

It will become apparent to those skilled in the art given the teachings herein that numerous modifications can be made to the illustrative embodiments shown that are within the scope of the claimed invention. That is, no limitations with respect to the embodiments shown and described herein are intended or should be inferred.

As a preliminary matter, for purposes of clarifying and describing embodiments of the invention, the following table provides a summary of certain acronyms and their corresponding definitions, as the terms are used herein:

Table of Acronym Definitions

| Acronym | Definition |
| --- | --- |
| BPMR | Bit patterned media recording |
| HAMR | Heat-assisted magnetic recording |
| SNR | Signal-to-noise ratio |
| TDMR | Two-dimensional magnetic recording |
| ARMR | Array-reader based magnetic recording |
| MISO | Multiple-input single-output |
| MIMO | Multiple-input multiple-output |
| DTS | Down-track separation |
| CTS | Cross-track separation |
| ITI | Inter-track interference |
| VCM | Voice coil motor |
| CPU | Central processing unit |
| SSD | Solid-state drive |
| RAM | Random access memory |
| PMR | Perpendicular magnetic recording |
| TP | Track pitch |
| BL | Bit length |
| BAR | Bit aspect ratio |
| RW | Reader width |
| AFE | Analog front end |
| OD | Outer diameter |
| MD | Mid-diameter |
| ID | Inner diameter |
| OTER | On-track error rate |
| OTC | Off-track capability |
| MD | Mid-diameter |
| BER | Bit error rate |
| SMR | Shingled magnetic recording |

FIG. 1 is a block diagram depicting at least a portion of an exemplary data storage system 100 in which one or more embodiments of the invention are employed. The storage system 100 includes a read/write channel 102 having reader set selection circuitry in accordance with embodiments of the invention, a preamplifier (preamp) 104 coupled with the read/write channel, an interface controller 106 coupled with the read/write channel, a hard disk controller 110 coupled with the interface controller, a motor controller 112 coupled with the hard disk controller, and a spindle motor 114 coupled with and operative to rotate a disk platter 116 comprising a plurality of tracks, or an alternative magnetic storage medium. A voice coil motor (VCM) 118 attached to an actuator arm is configured to maintain a position of at least one read/write head 120 above a surface of the disk platter 116 as a function of one or more control signals generated by the motor controller 112. In a multi-reader configuration, the system 100 would include multiple read/write heads and corresponding preamplifiers coupled therewith. Thus, read/write head 120 is intended to collectively represent one or a plurality of read/write heads; likewise, preamplifier 104 is intended to collectively represent one or a plurality of preamplifiers coupled with corresponding read/write heads.

The read/write channel 102 is the fundamental mixed signal analog/digital module of the disk drive storage system 100 and, although shown as a single block, is actually comprised of two separate channels: a read channel and a write channel. The read channel is operative to extract, from the disk platter 116, a clock signal, equalize an input read head signal (i.e., read pulse), make a determination regarding a digital state (e.g., logic "1" or "0") of the input read head signal, and decode read data 122 as a function of the input read head signal. The write channel is operative to encode write data 124 for storage on the disk platter 116 in the form of magnetic field orientations indicative of a logical state of the write data. The read/write channel 102 is assisted by the preamplifier 104, which is configured to drive the write head portion of the read/write head 120 during a write process and to amplify the input signal obtained from the read head portion of the read/write head during a read process.

The interface controller 106 is adapted to control a data interface between the read/write channel 102 and a central processing unit (CPU) or alternative controller, which may include handling interrupts and data transfer protocols common to magnetic drives, optical drives, solid-state drives (SSDs), etc. The interface controller 106 may optionally include an auxiliary buffer, which can be implemented, for example, using random access memory (RAM), for caching and queuing data, providing long data-bursts to improve speed and reduce bus latency. The hard disk controller 110 calculates actuator trajectories and controls the spindle motor 114 and VCM 118, via the motor controller 112, to correctly position and maintain the read/write head 120 on a prescribed track of the disk platter 116.

As previously stated, one disadvantage with bit patterned media recording (BPMR) and heat-assisted magnetic recording (HAMR) is that these approaches, while providing improved recording density, require substantial modifications to the media and heads which significantly increases overall cost. ARMR is seen as an intermediate approach between current perpendicular magnetic recording (PMR) and two-dimensional magnetic recording (TDMR) which provides a significant increase in storage density compared to PMR while avoiding the challenges posed by BPMR and HAMR. Multiple-input single-output (MISO) ARMR uses standard media and an array of read heads, also referred to herein as an array reader, in conjunction with modest changes in read-back signal processing to achieve improved SNR of a single target track that is being read. Similarly, multiple-input multiple-output (MIMO) ARMR uses an array reader configured to simultaneously, or nearly simultaneously, retrieve information from multiple target tracks for achieving higher data throughput. MIMO operation is generally less tolerant to skew.

TDMR is a known recording architecture intended to support storage densities beyond those of conventional recording systems. TDMR utilizes multiple readers to read from multiple adjacent tracks and uses inter-track interference (ITI) to decode the signal from a target track. The gains achieved from TDMR come primarily from more powerful coding and signal processing algorithms which allow data bits to be stored more densely on a magnetic storage medium (e.g., disk). In a traditional disk architecture with a single read head, reading a single sector with TDMR generally involves reading the sectors on adjacent tracks, requiring additional disk rotations. To circumvent this problem, TDMR disks may use multiple read heads, also referred to as readers, on the same support arm, typically referred to as a slider, thus restoring traditional read service times. One disadvantage of using a multi-reader approach is that there is an inherent offset (i.e., delay) between respective signals obtained from the read heads due, at least in part, to the physical distance separating the read heads. Although manufacturers may provide information regarding the physical distances between the multiple read heads, actual offset between the respective signals obtained from the read heads, referred to herein as reader offset, can vary based on several factors. Such factors which may affect reader offset include, but are not limited to, environmental factors, such as, for example, temperature and mechanical vibration, as well as manufacturing factors, such as, for example, skew between the slider and the disk surface, and alignment of the read heads relative to one another and/or to the slider, among other factors.

Figure 2:
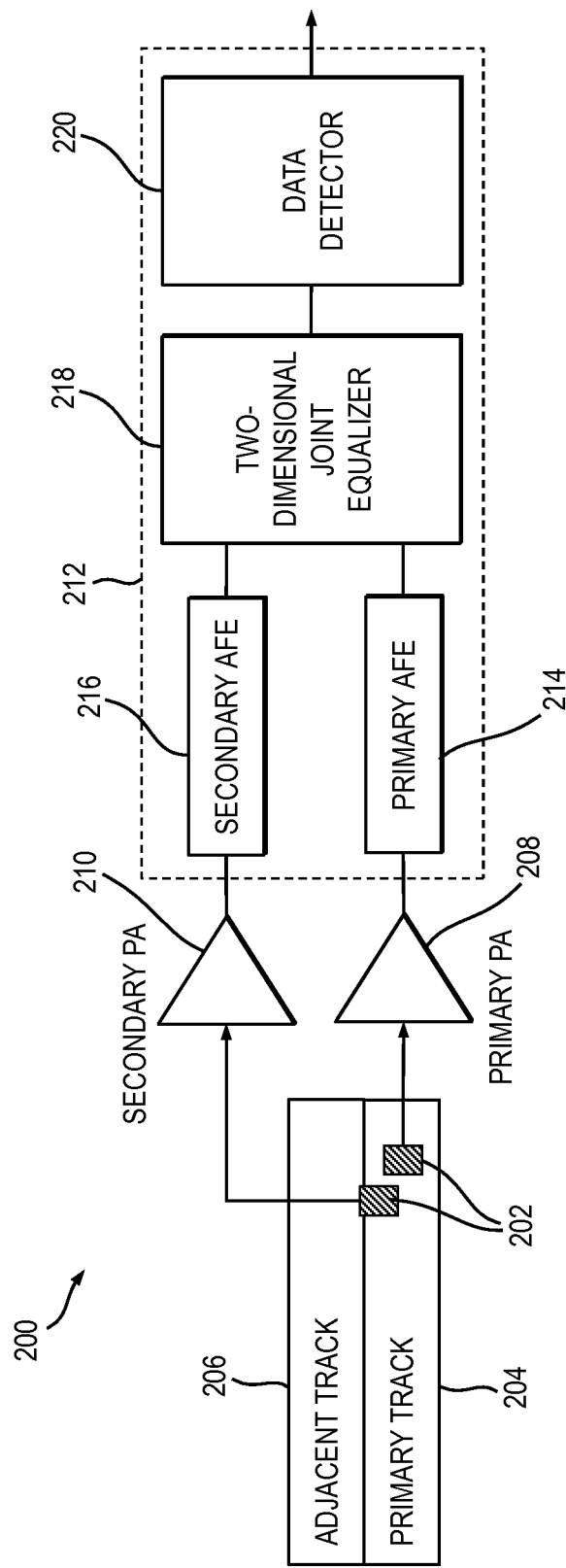
FIG. 2 is a block diagram depicting at least a portion of read-back signal processing blocks for an exemplary two-reader ARMR system.

ARMR achieves an areal density gain by employing multi-dimensional joint signal processing of multiple read-back signals from the array reader. With reference now to FIG. 2, a block diagram depicts at least a portion of read-back signal processing blocks for an exemplary two-reader ARMR system 200. The system 200 includes two readers 202 positioned to read data on corresponding tracks, or portions of a track, of a magnetic recording medium; particularly, a primary (i.e., target) track 204 and an adjacent track 206 proximate to the primary track. The respective read signals obtained from the readers 202 are supplied to corresponding primary preamplifier (PA) 208 and secondary preamplifier 210. Amplified read signals generated by the preamplifiers 208, 210 are supplied to a read channel module 212 for further processing. Specifically, a primary analog front end (AFE) 214 is adapted to receive the amplified read signal generated by the primary preamplifier 208, and a secondary AFE 216 is adapted to receive the amplified read signal generated by the secondary preamplifier 210. The AFEs 214, 216 are operative to convert the analog amplified read signals generated by the preamplifiers 208, 210 to corresponding digital read signals. The digital read signals are supplied to a two-dimensional joint equalizer 218 which is operative to equalize its combined output to an ideal target signal, where the target can be a partial response (PR) target, to thereby generate an equalized signal. The equalized signal generated by the two-dimensional joint equalizer 218 is supplied to a Viterbi-like data detector 220, which is operative to detect the written data stored on the magnetic storage medium from the equalized signal, to thereby generate an output signal of the two-reader system 200. It is to be understood that the output of the data detector 220 can be a hard decision (e.g., "0" or "1") or a soft decision (e.g., probability of a "0" and/or a "1") regarding information read from the selected track(s).

The locations of the readers in an ARMR system are characterized by their cross-track separation (CTS) and/or down-track separation (DTS) between readers. Embodiments of the invention are shown and described herein in the context of a multi-reader head including two read-elements (i.e., readers) that are positioned according to a prescribed CTS and DTS. Due to skew, among other factors (e.g., temperature, vibration, etc.), the effective CTS between readers will vary. Further, the larger the DTS between read-elements without skew, denoted by $DTS_0$ or d, the more the CTS will vary with skew. Likewise, the smaller the DTS between readers in a multi-reader head, the smaller the sensitivity to skew angle. The term "skew angle" as used herein is intended to refer broadly to an angle between a reader assembly, to which one or more readers are attached, and a tangent to a target track to be read. It is to be appreciated that while exemplary embodiments of the invention are described herein in the context of a multi-reader head including two readers, embodiments of the invention are not limited to any specific number of readers.

Figure 3A:
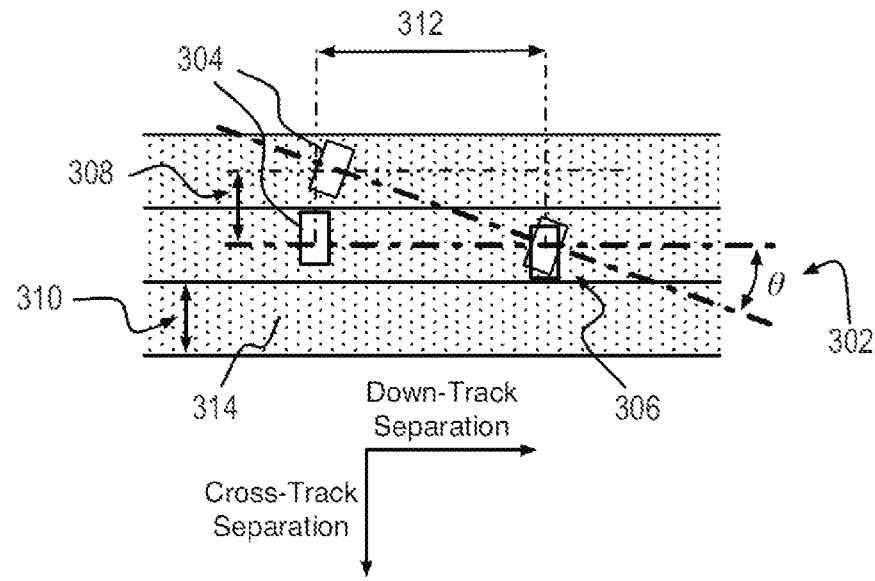
FIGS. 3A-3C are top plan views conceptually depicting how reader cross-track separation varies with skew angle for an exemplary multi-reader head.
Figure 3B:
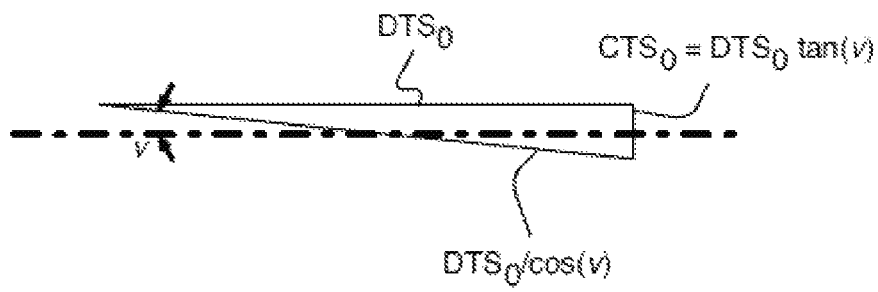
Figure 3C:
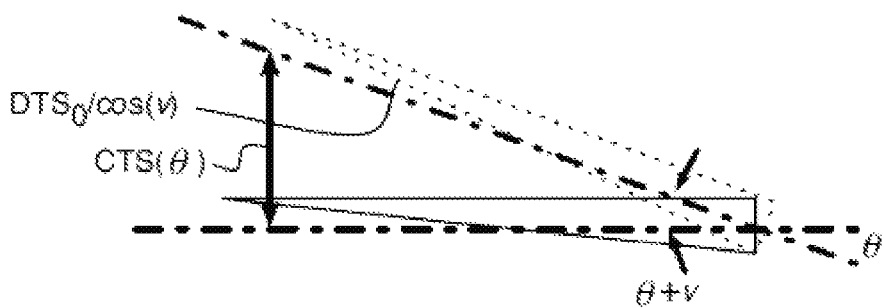

FIGS. 3A-3C are top plan views conceptually depicting how reader CTS varies with skew angle 302 for an exemplary multi-reader head. In FIG. 3A, a multi-reader head is shown disposed at two different skew angles; namely, 0 and θ degrees. The zero-skew case is indicative of the DTS between the readers being aligned with a tangent to a centerline of a corresponding track being read. It follows that the difference between the two different skew angles is θ 302. The multi-reader head includes two readers, 304 and 306, shown disposed relative to one another for each of the two skew angle scenarios. A certain CTS 308 occurs between the two readers given the skew angle θ and is represented by ζ(θ), also denoted by CTS(θ). Note, that DTS 312 decreases with increasing skew angle θ. It should also be understood that, in one or more embodiments, CTS and DTS are measured in terms of TP 310 (three tracks, e.g., 314, are shown in FIG. 3A). For example, DTS=2 TP means that the down-track separation of two readers of the multi-reader head is equal to two times the track pitch, irrespective of skew angle.

FIG. 3B illustrates the CTS and DTS between two readers at 0 degree skew angle, denoted by $CTS_0$ and $DTS_0$, respectively, with ν denoting an angle of separation between the readers at zero skew relative to a tangent to a centerline of the corresponding track being read. It should be understood that a multi-reader head having a shorter DTS experiences smaller CTS variations for the same skew angle (e.g., CTS variation is smaller for a multi-reader head having DTS=3 TP compared to that of a multi-reader head having DTS=9 TP). By way of example only and without limitation, for comparison purposes, the bit length (BL) for data being stored on a track is typically a portion of the track pitch (e.g., BL about 0.25 TP; bit aspect ratio (BAR)=4), and a given reader width (RW) is generally larger than the BL (e.g., RW is about 0.6 TP). Here, BAR is defined as the ratio of track pitch to bit length and is unitless (i.e., BAR=TP/BL).

With reference to FIG. 3C, a relationship describing the variation of CTS with skew angle for a given $DTS_0$ and $CTS_0$, in accordance with an illustrative embodiment, is written as:

$$CTS(\theta) = \frac{DTS_0 \cdot \sin(\theta + v)}{\cos v}$$
$$= \frac{DTS_0 \cdot (\sin(\theta)\cos(v) + \cos(\theta)\sin(v))}{\cos v}$$

$CTS(\theta) = DTS_0\sin(\theta) + CTS_0\cos(\theta) \sim CTS_0 + DTS_0\theta$, for small $\theta$.

Here, a small skew angle $\theta$ can be between, for example, about −16 degrees and 16 degrees. In another embodiment, the range of $\theta$ is between about −16 degrees and 20 degrees. Different hardware (e.g., disk platters and read-elements) can have different skew angle ranges defining different zones of operation. It is to be understood, however, that embodiments of the invention are not limited to any specific skew angle or range of angles.

Figure 4:
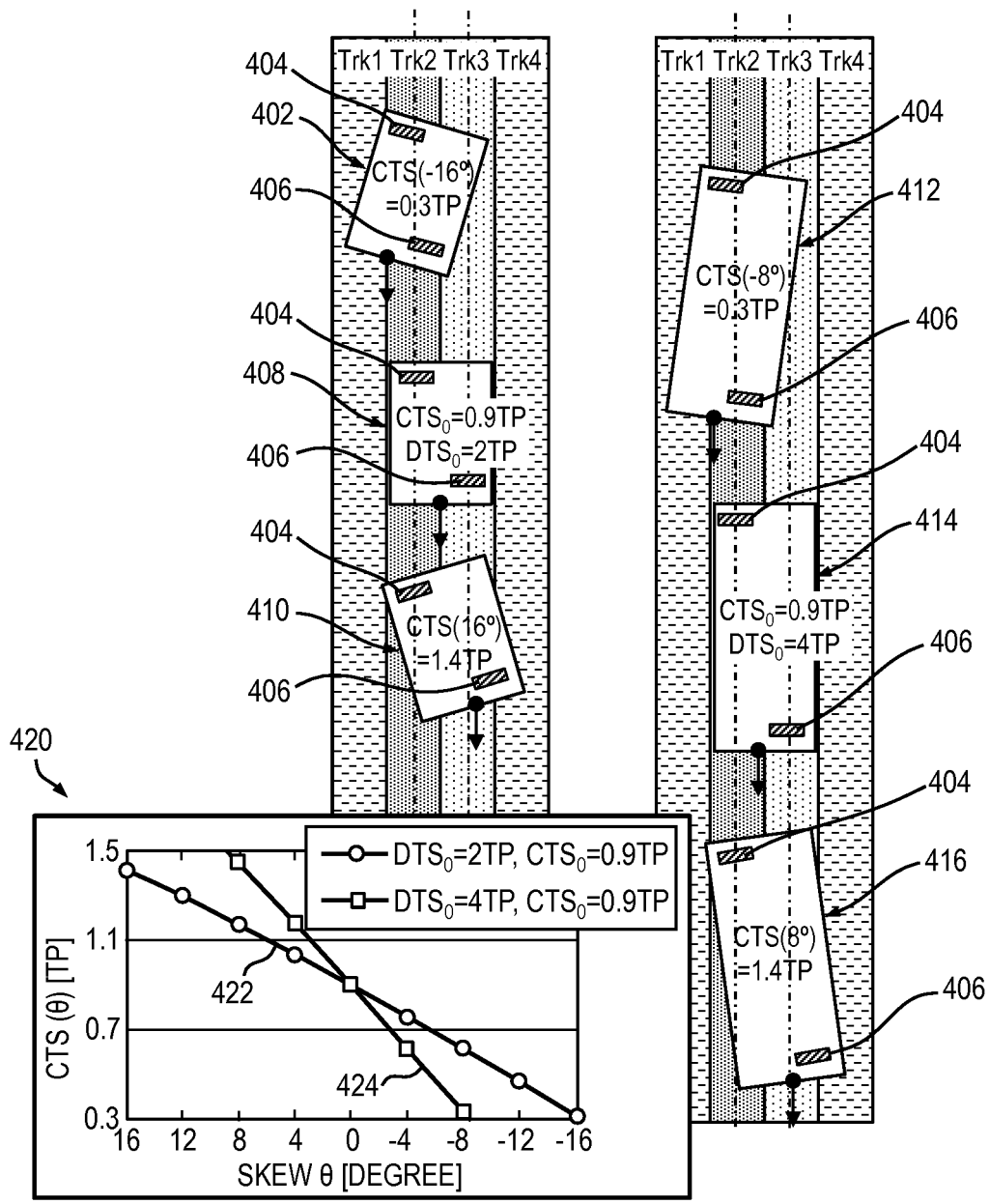
FIG. 4 is a top plan view depicting a two-reader head in various cross-track separation, down-track separation and skew angle configurations relative to corresponding tracks in an ARMR system.

The performance of a system utilizing ARMR will be dependent upon the respective locations of the readers relative to a center of a corresponding target track to be read. By way of illustration only and without limitation, FIG. 4 is a top plan view depicting a two-reader head in various CTS, DTS and skew angle configurations relative to corresponding tracks in an ARMR system. In a first configuration 402, a read head includes a first reader 404 and a second reader 406 having a CTS of 0.9 TP and a DTS of 2 TP at zero skew (i.e., $CTS_0$=0.9 TP; $DTS_0$=2 TP). A skew angle of the read head in configuration 402 is −16 degrees, and a CTS between the first and second readers 404, 406 is 0.3 TP (i.e., CTS(−16°)=0.3 TP). With the location of the first reader 404 positioned approximately over a centerline of corresponding track 2, as shown in configuration 402, which may be encountered reading an outer diameter (OD) zone of the magnetic disk/medium, the second reader 406 will be positioned just off the centerline of track 2. Accordingly, this configuration is only suitable for operation in an ARMR MISO mode.

In configuration 408, which may be considered a mid-diameter (MD) zone of the magnetic disk/medium, the skew angle is zero, and therefore a CTS will be $CTS_0$=0.9 TP and a DTS will be $DTS_0$=2 TP. In this configuration, the first reader 404 will be positioned over a centerline of corresponding track 2 and the second reader 406 will be positioned over a centerline of corresponding track 3. Consequently, configuration 408 is suitable for use in a MIMO mode of operation. In configuration 410, which may be considered an inner diameter (ID) zone of the magnetic disk/medium, the skew angle is 16 degrees, and therefore the CTS will be 1.4 TP (i.e., CTS (16°)=1.4 TP). In this configuration, with the first reader 404 positioned over a centerline of corresponding track 2, the second reader 406 will be positioned over a boundary between tracks 3 and 4, and therefore configuration 410 would not be well-suited for operation in a MIMO mode. Thus, the exemplary two-reader arrangement with $DTS_0$=2 TP cannot support a MIMO mode of operation for all skew angles. Rather, as depicted by plot 422 in graph 420, the two-reader arrangement having a DTS of 2 TP and a CTS of 0.9 TP at zero skew can only support MIMO operation for skew angles in a range from about −6 degrees to 8 degrees.

As the DTS between readers increases, the usable range of skew angles in which the two-reader arrangement can be used for MIMO operation becomes increasingly narrower. For example, in configuration 412, the first reader 404 and second reader 406 have a CTS of 0.9 TP and a DTS of 4 TP at zero skew (i.e., $CTS_0$=0.9 TP; $DTS_0$=4 TP). A skew angle of the read head in configuration 412 is −8 degrees, and a CTS between the first and second readers 404, 406 is 0.3 TP. With the location of the first reader 404 positioned to the left of the centerline of track 2, the second reader 406 will be positioned to the right of the centerline of track 2. Accordingly, this configuration does not support an ARMR MIMO mode, and instead it is suitable for an ARMR MISO mode for recovering track 2. In configuration 414, with zero skew, the CTS will be 0.9 TP and the DTS will be 4 TP. In this configuration, the first reader 404 will be positioned over a centerline of track 2 and the second reader 406 will be positioned over a centerline of track 3. In this manner, configuration 414 supports a MIMO mode of operation. In configuration 416, the skew angle is 8 degrees and the CTS is 1.4 TP. In this configuration, with the first reader 404 positioned over the centerline of track 2, the second reader 406 will be positioned over a boundary between tracks 3 and 4, and therefore configuration 416, like configuration 412, cannot support a MIMO mode. As depicted by plot 424 in graph 420, the two-reader arrangement having a DTS of 4 TP and a CTS of 0.9 TP at zero skew will only support MIMO operation for skew angles in a range from about −3 degrees to 4 degrees.

As illustrated in FIG. 4, ARMR using two readers suffers large skew-dependent CTS variations, which is undesirable particularly in an ARMR MIMO application. In accordance with embodiments of the invention, by increasing the number of readers employed and by carefully configuring the DTS and CTS among the plurality of readers, a multi-reader ARMR system can be used to facilitate both MIMO and MISO modes of operation over all prescribed zones, and hence greater skew tolerance in the ARMR system is achieved. Embodiments of the invention uniquely exploit benefits provided by each of the readers, even when a given reader is not positioned, relative to a corresponding target track, in a manner which provides optimal signal strength. Embodiments of the invention are shown and described herein in the context of an array reader comprising three readers which are positioned in various illustrative CTS and DTS configurations, as will be described in further detail in conjunction with FIGS. 5 through 9. While embodiments of the invention are described herein which utilize an ARMR reader comprising three readers, it is to be understood that embodiments of the invention are not limited to any specific number of readers.

Figure 5:
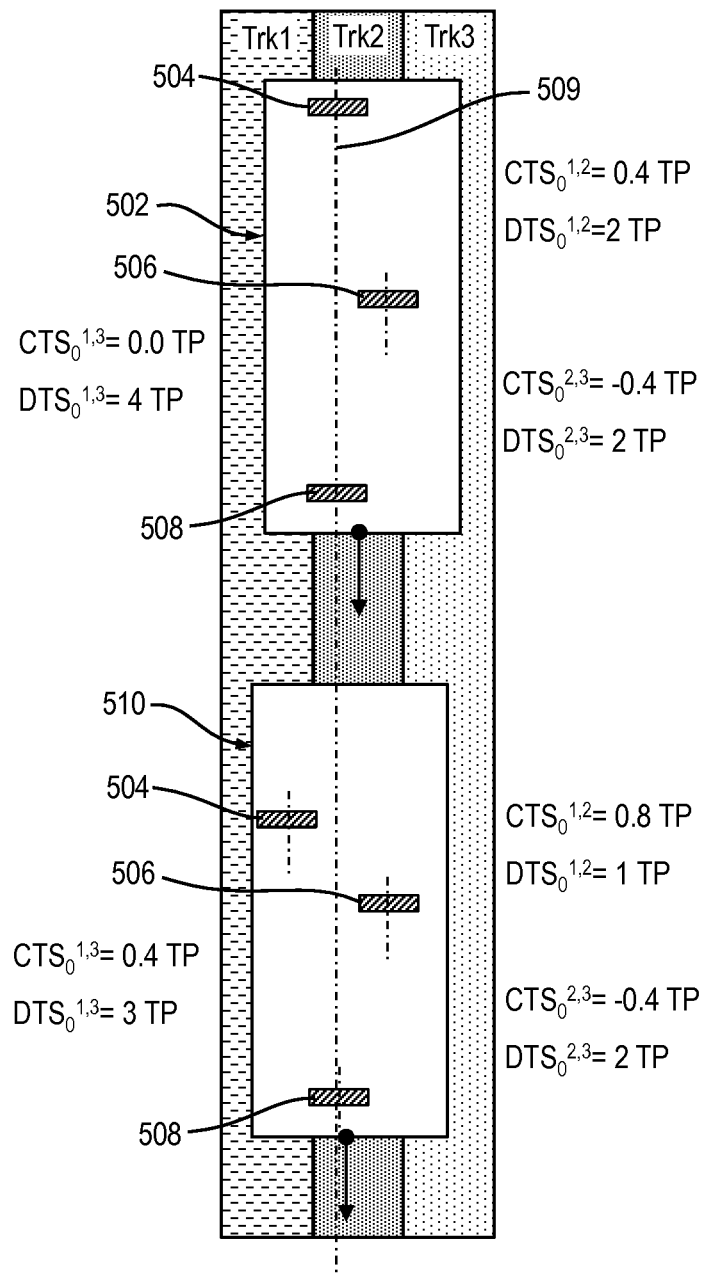
FIG. 5 is a top plan view depicting exemplary configurations of a read head comprising three readers in a zero-skew position relative to a corresponding magnetic storage medium, according to one or more embodiments of the invention.

FIG. 5 is a top plan view depicting exemplary configurations of a read head comprising three readers in a zero-skew position relative to a corresponding magnetic storage medium, according to one or more embodiments of the invention. With reference to FIG. 5, by way of example only and without limitation, in a first configuration 502, a first reader 504, a second reader 506 and a third reader 508 are arranged such that at zero skew, a CTS between the first and second readers ($CTS_0^{1,2}$) is 0.4 TP, a DTS between the first and second readers ($DTS_0^{1,2}$) is 2 TP, a CTS between the first and third readers ($CTS_0^{1,3}$) is 0.0 TP (i.e., the first and third readers are aligned with one another in a direction parallel with a reference line 509 tangent to a corresponding track, Track 2), a DTS between the first and third readers ($DTS_0^{1,3}$) is 4 TP, a CTS between the second and third readers ($CTS_0^{2,3}$) is −0.4 TP, and a DTS between the second and third readers ($DTS_0^{2,3}$) is 2 TP.

In configuration 502, the second reader 506 is placed between the first reader 504 and third reader 508 in a down-track direction, and is placed on an opposite side of reference line 509, in a cross-track direction, relative to the first and third readers. Although embodiments of the invention are not limited to any specific position(s) of the readers, the arrangement of configuration 502 shown in FIG. 5 offers a sufficient selection of reader combinations, since the CTS between the first and second readers is affected in an opposite manner compared to the CTS between the second and third readers.

In a second configuration 510, the first reader 504, second reader 506 and third reader 508 are arranged such that at zero skew, a CTS between the first and second readers ($CTS_0^{1,2}$) is 0.8 TP, a DTS between the first and second readers ($DTS_0^{1,2}$) is 1 TP, a CTS between the first and third readers ($CTS_0^{1,3}$) is 0.4 TP, a DTS between the first and third readers ($DTS_0^{1,3}$) is 3 TP, a CTS between the second and third readers ($CTS_0^{2,3}$) is −0.4 TP, and a DTS between the second and third readers ($DTS_0^{2,3}$) is 2 TP. The first reader 504 is positioned over Track 1 and the second and third readers 506, 508 are each positioned proximate opposite outside peripheral ends of Track 2, thus enabling the multi-reader head to support MIMO operation. In configuration 510, as in configuration 502, the second reader 506 is placed between the first reader 504 and third reader 508 in a down-track direction, and is placed away from the first and third readers in a cross-track direction, on an opposite side of reference line 509 which bisects the multi-reader head. Again, embodiments of the invention are not limited to any specific position(s) of the readers.

Figure 6:
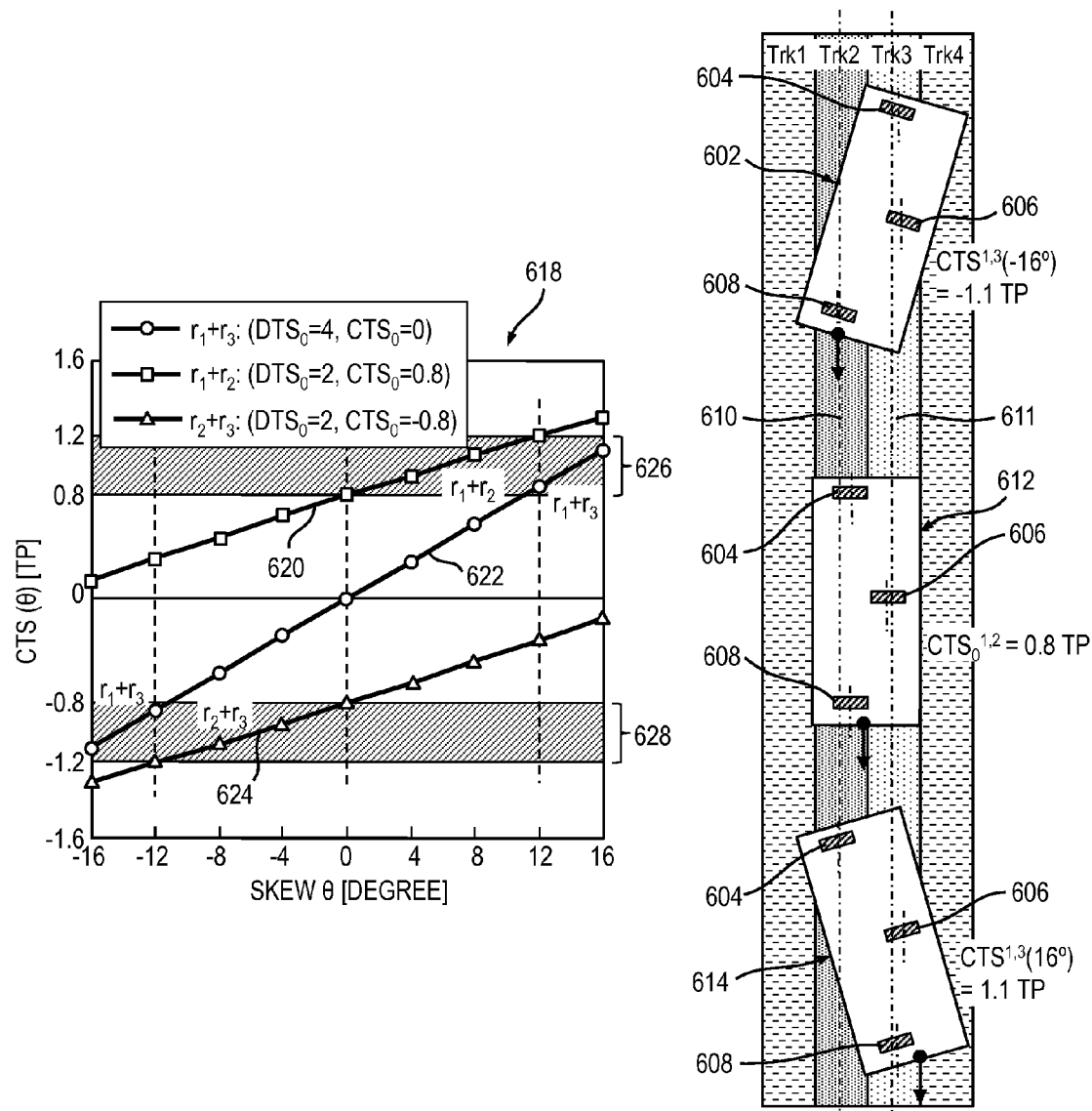
FIG. 6 depicts an illustrative methodology for configuring the down-track separation (DTS) and cross-track separation (CTS) among readers as a function of skew angle given a first exemplary placement of readers in a multi-reader head configured for multiple input multiple output (MIMO) operation, according to an embodiment of the invention.
Figure 7:
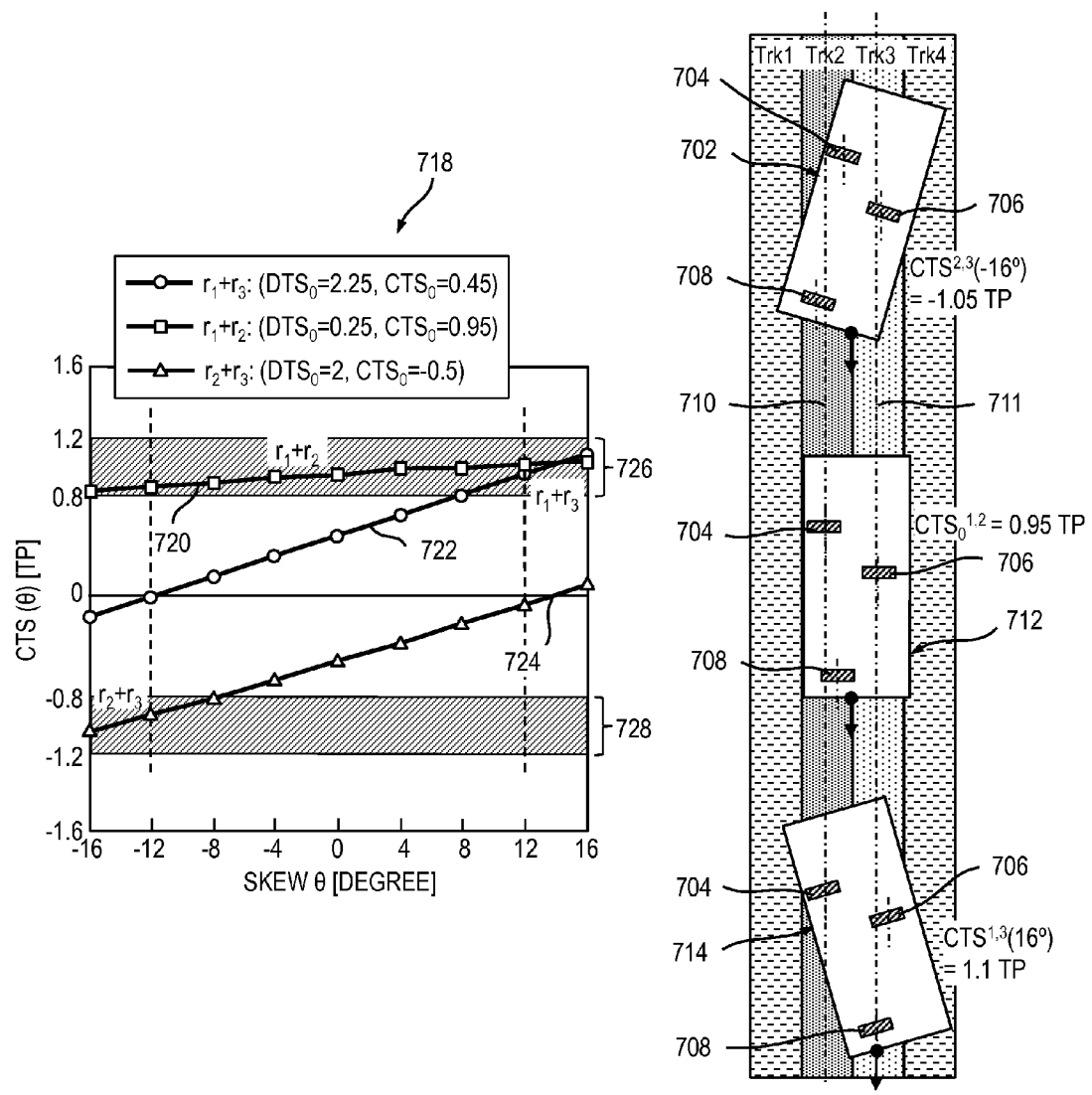
FIG. 7 conceptually depicts an illustrative methodology for configuring DTS and CTS among readers as a function of skew angle given a second exemplary placement of readers in a multi-reader head configured for MIMO operation, according to an embodiment of the invention.

By way of example only and without limitation, FIGS. 6 and 7 conceptually depict different reader placement arrangements of a three-reader head for use in a MIMO ARMR application. As will be described in further detail below, at least one of the three readers is preferably positioned close to a center of each of the two tracks to be detected. A three-reader ARMR head with CTS between about 0.8 and 1.2 TP for any pair of readers enables detection of two tracks over a prescribed skew range of $|\theta| \leq 16$ degrees. FIG. 6 conceptually depicts a larger overall DTS configuration and FIG. 7 conceptually depicts a smaller overall DTS configuration, according to embodiments of the invention.

More particularly, FIG. 6 depicts an illustrative methodology for configuring the DTS and CTS among readers as a function of skew angle given a first exemplary placement of readers in a multi-reader head configured for MIMO operation, according to an embodiment of the invention. With reference to FIG. 6, a multi-reader head comprising a first reader 604, a second reader 606 and a third reader 608 is shown in three different skew angle (zone) configurations, 602, 612 and 614. At zero skew (i.e., θ=0°), the CTS between the first and second readers ($CTS_0^{1,2}$) is 0.8 TP, the DTS between the first and second readers ($DTS_0^{1,2}$) is 2 TP, the CTS between the first and third readers ($CTS_0^{1,3}$) is 0 TP, the DTS between the first and third readers ($DTS_0^{1,3}$) is 4 TP, the CTS between the second and third readers ($CTS_0^{2,3}$) is −0.8 TP, and the DTS between the second and third readers ($DTS_0^{2,3}$) is 2 TP.

In a first exemplary zone configuration 602, the skew angle is −16 degrees. At a skew angle of −16 degrees, the CTS between the first and second readers ($CTS^{1,2}(-16°)$) is about 0.2 TP, the CTS between the first and third readers ($CTS^{1,3}(-16°)$) is −1.1 TP, and a CTS between the second and third readers ($CTS^{2,3}(-16°)$) is about −1.3 TP. In this configuration, the first and second readers 604, 606 are positioned about over a centerline 611 of track 3 and the third reader 608 is positioned over a centerline 610 of track 2. In a second exemplary zone configuration 612, the skew angle is 0 degrees, resulting in a CTS between the first and second readers ($CTS^{1,2}(0°)$) equal to 0.8 TP, the CTS between the first and third readers ($CTS^{1,3}(0°)$) equal to 0 TP, and the CTS between the second and third readers ($CTS^{2,3}(0°)$) equal to −0.8 TP. In this configuration, the first and third readers 604, 608 are positioned over track 2, just off the centerline 610 of track 2, and the second reader 606 is positioned over track 3, just off the centerline 611 of track 3. In a third exemplary zone configuration 614, the skew angle is 16 degrees, making the CTS between the first and second readers ($CTS^{1,2}(16°)$) equal to about 1.3 TP, the CTS between the first and third readers ($CTS^{1,3}(16°)$) equal to about 1.1 TP, and the CTS between the second and third readers ($CTS^{2,3}(16°)$) equal to about −0.2 TP. In this configuration, the first reader 604 is positioned over the centerline 610 of track 2, and the second and third readers 606, 608 are positioned over track 3, with the third reader over the centerline 611 of track 3 and the second reader just off the centerline of track 3.

Plots 620, 622 and 624 in graph 618 of FIG. 6 show exemplary CTS variations between combinations of the first and second readers (r1+r2), the first and third readers (r1+r3), and the second and third readers (r2+r3), respectively, as a function of skew angle θ. As apparent from graph 618, the exemplary configuration of the CTS and DTS of the ARMR head shown in FIG. 6 supports detection of two tracks (ARMR MIMO mode) using all three readers, requiring three analog front ends (AFEs), and also supports detection of two tracks using two of three readers, requiring only two AFEs, over a prescribed range of skew angles $|\theta| \leq 16$ degrees.

Specifically, in order to detect two tracks in a MIMO application, the CTS between readers is larger compared to a MISO application. Thus, for the exemplary ARMR MIMO embodiment, assume there are two desired target CTS ranges between any combination of two readers over a skew angle range of ±16 degrees; namely, a first range 626 corresponding to a CTS from 0.8 TP to 1.2 TP, and a second range 628 corresponding to CTS from −0.8 TP to −1.2 TP, as shown in graph 618 (i.e., 0.8 TP<|$CTS^{i,j}(\theta)$|<1.2 TP for $|\theta''| \leq 16$ degrees, where i and j are integers indicative of reader numbers). It is to be appreciated that embodiments of the invention are not limited to any specific CTS range.

With reference to graph 618, for the illustrative placement of readers shown in FIG. 6, it is evident that for skew angles between −16 degrees and about −12 degrees, a combination including the first and third readers 604, 608 ($r_1+r_3$) is selected to provide more optimal (e.g., largest amplitude) read signals compared to the second reader 606 (see plot 622), and for skew angles between about −12 degrees and 0 degrees, a combination including the second and third readers 606, 608 ($r_2+r_3$) is selected (see plot 624), since these selected reader combinations exhibit cross-track separations that are within the second target range 628. Similarly, for skew angles between 0 degrees and about 12 degrees, a combination including the first and second readers 604, 606 ($r_1+r_2$) is selected (see plot 620), and for skew angles between about 12 degrees and 16 degrees, a combination including the first and third readers 604, 608 ($r_1+r_3$) is again selected (see plot 622), since these selected reader combinations exhibit cross-track separations that are within the first target range 626.

FIG. 7 conceptually depicts an illustrative methodology for configuring DTS and CTS among readers as a function of skew angle given a second exemplary placement of readers in a multi-reader head configured for MIMO operation, according to an embodiment of the invention. As shown in FIG. 7, a multi-reader head comprising a first reader 704, a second reader 706 and a third reader 708 is shown in three different skew angle (zone) configurations, 702, 712 and 714. The multi-reader head is characterized at zero skew as having a CTS between the first and second readers ($CTS_0^{1,2}$) of 0.95 TP, a DTS between the first and second readers ($DTS_0^{1,2}$) of 0.25 TP, a CTS between the first and third readers ($CTS_0^{1,3}$) of 0.45 TP, a DTS between the first and third readers ($DTS_0^{1,3}$) of 2.25 TP, a CTS between the second and third readers ($CTS_0^{2,3}$) of −0.5 TP, and a DTS between the second and third readers ($DTS_0^{2,3}$) of 2 TP.

In a first exemplary zone configuration 702, at a skew angle of −16 degrees, the CTS between the first and second readers ($CTS^{1,2}(-16°)$) is about 0.85 TP, the CTS between the first and third readers ($CTS^{1,3}(-16°)$) is about −0.2 TP, and a CTS between the second and third readers ($CTS^{2,3}(-16°)$) is about −1.05 TP. In this configuration, the first and third readers 704, 708 are positioned over track 2, on opposite sides of a centerline 710 of track 2 but within the boundaries of track 2, and the second reader 706 is positioned about over a centerline 711 of track 3. In a second exemplary zone configuration 712, the skew angle is 0 degrees, and therefore the CTS between the first and second readers ($CTS^{1,2}(0°)$) is 0.95 TP, the CTS between the first and third readers ($CTS^{1,3}(0°)$) is 0.45 TP, and the CTS between second and third readers)) ($CTS^{2,3}(0°)$) is −0.5 TP, as previously stated. In this configuration, the first and third readers 704, 708 are positioned over track 2, with the first reader over the centerline 710 of track 2 and the third reader positioned just off the centerline of track 2, and the second reader 706 is positioned over the centerline 711 of track 3. In a third exemplary zone configuration 714, the skew angle is 16 degrees, resulting in a CTS between the first and second readers ($CTS^{1,2}(16°)$) of about 1.0 TP, a CTS between the first and third readers ($CTS^{1,3}(16°)$) of about 1.1 TP, and a CTS between the second and third readers ($CTS^{2,3}(16°)$) of about 0.1 TP. In this configuration, the first reader 704 is positioned over the centerline 710 of track 2 and the second and third readers 706, 708 are positioned over track 3, with the third reader positioned over the centerline 711 of track 3 and the second reader positioned just off the centerline of track 3.

Plots 720, 722 and 724 in graph 718 of FIG. 7 show exemplary CTS variations between combinations of the first and second readers (r1+r2), the first and third readers (r1+r3), and the second and third readers (r2+r3), respectively, as a function of skew angle θ. As apparent from graph 718, the exemplary configuration of the CTS and DTS of the ARMR head shown in FIG. 7 supports detection of two tracks (ARMR MIMO mode) using all three readers, requiring three analog front ends (AFEs), and also supports detection of two tracks using two of three readers, requiring only two AFEs, over a prescribed range of skew angles |θ|≤16 degrees.

Specifically, for the illustrative ARMR MIMO embodiment shown in FIG. 7, there are two desired target CTS ranges between any combination of two readers over a skew angle range of ±16 degrees; namely, a first range 726 corresponding to a CTS from 0.8 TP to 1.2 TP, and a second range 728 corresponding to CTS from −0.8 TP to −1.2 TP, as shown in graph 718 (i.e., 0.8 TP<|$CTS^{i,j}(\theta)$|<1.2 TP for |θ|≤16 degrees, where i and j are integers indicative of reader numbers). With reference to graph 718, for the illustrative placement of readers shown in FIG. 7, it is evident that for skew angles between −16 degrees and about −12 degrees, a combination including the second and third readers 706, 708 is selected (see plot 724), since this selected reader combination exhibits a CTS that is within the second target range 728 for the noted range of skew angles. For skew angles between about −12 degrees and about 14 degrees, a combination including the first and second readers 704, 706 is selected (see plot 720), and for skew angles between about 14 degrees and 16 degrees, a combination including the first and third readers 704, 708 is selected (see plot 722), since these selected reader combinations exhibit cross-track separations that are within the first target range 726.

Figure 8:
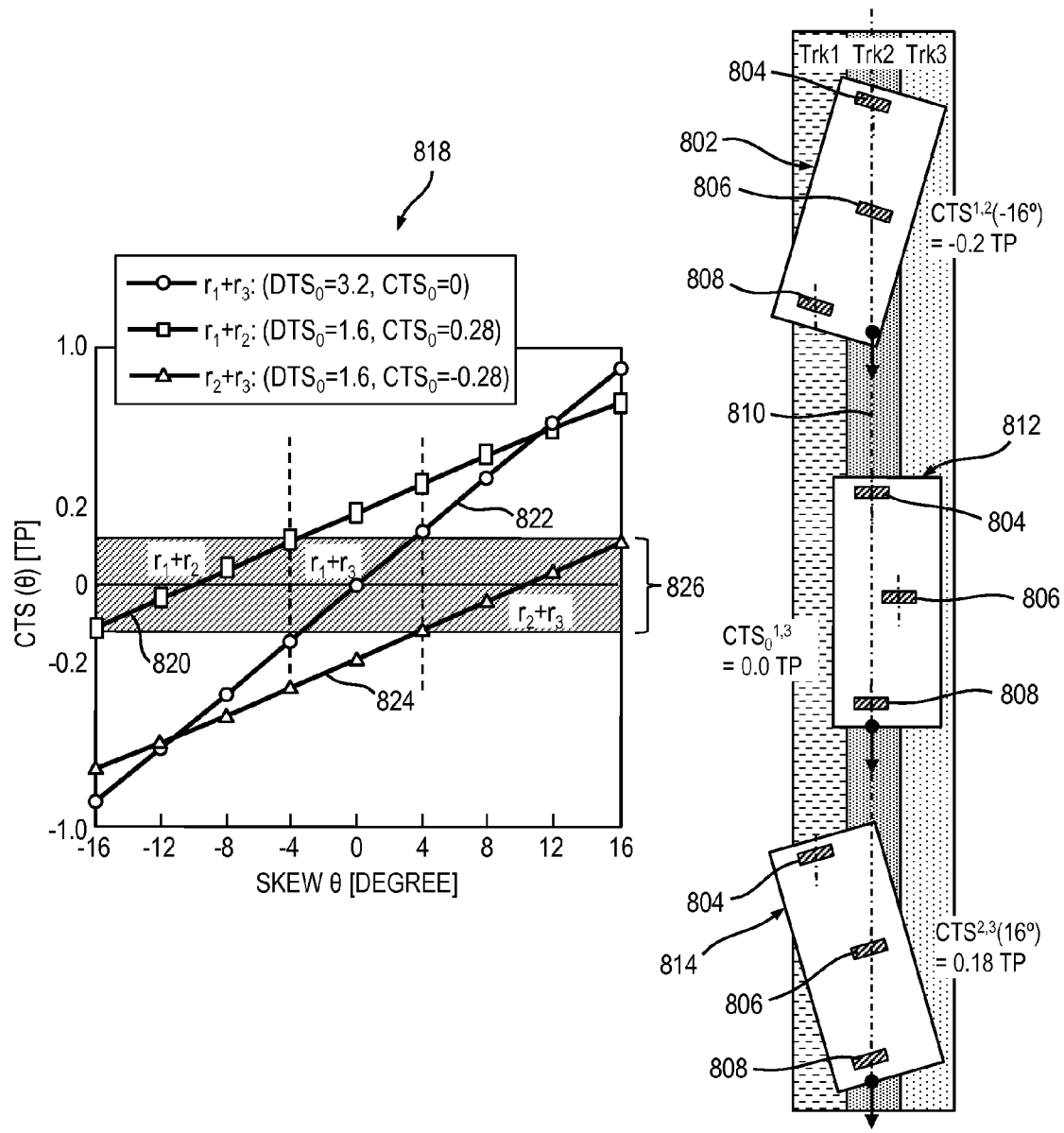
FIG. 8 depicts an illustrative methodology for configuring the DTS and CTS among readers as a function of skew angle given a first exemplary placement of readers in a multi-reader ARMR head configured for multiple input single output (MISO) operation, according to an embodiment of the invention.

While the illustrative reader placement scenarios shown in FIGS. 6 and 7 are suitable for use in a MIMO ARMR application, it is to be understood that aspects according to embodiments of the invention are easily configured to support MISO ARMR operation. In a MISO mode of operation, one or more embodiments of the invention are configured to utilize a reader providing the highest amplitude signal from among the plurality of readers, and to use the remaining readers for enhancing SNR in the ARMR system. By way of example only and without limitation, FIGS. 8 and 9 conceptually depict different exemplary reader placement arrangements of a three-reader head for use in a MISO ARMR application. As will be described in further detail below, at least two of the three readers are preferably configured so as to be positioned close to the center of a track being detected. A three-reader ARMR head configured with CTS between about −0.2 and 0.2 TP for any pair of readers enables detection of one track with relatively high SNR over a prescribed skew range of |θ|≤16 degrees. FIG. 8 conceptually depicts a larger overall DTS configuration and FIG. 9 conceptually depicts a smaller overall DTS configuration, according to embodiments of the invention.

More particularly, FIG. 8 depicts an illustrative methodology for configuring the DTS and CTS among readers as a function of skew angle given a first exemplary placement of readers in a multi-reader ARMR head configured for MISO operation, according to an embodiment of the invention. With reference to FIG. 8, a multi-reader head comprising a first reader 804, a second reader 806 and a third reader 808 is shown in three different skew angle (zone) configurations, 802, 812 and 814. At zero skew (i.e., θ=0°), the CTS between the first and second readers ($CTS_0^{1,2}$) is 0.28 TP, the DTS between the first and second readers ($DTS_0^{1,2}$) is 1.6 TP, the CTS between the first and third readers ($CTS_0^{1,3}$) is 0 TP, the DTS between the first and third readers ($DTS_0^{1,3}$) is 3.2 TP, the CTS between the second and third readers ($CTS_0^{2,3}$) is −0.28 TP, and the DTS between the second and third readers ($DTS_0^{2,3}$) is 1.6 TP.

In a first exemplary zone configuration 802, the skew angle is −16 degrees, making the CTS between the first and second readers ($CTS^{1,2}(-16°)$) equal to about −0.2 TP, the CTS between the first and third readers ($CTS^{1,3}(-16°)$) equal to about −0.85 TP, and a CTS between the second and third readers ($CTS^{2,3}(-16°)$) equal to about −0.7 TP. In this configuration, the first and second readers 804, 806 are positioned over a centerline 810 of the track being read (track 2) and the third reader 808 is positioned approximately over a center of track 1. In a second exemplary zone configuration 812, the skew angle is 0 degrees, making the CTS between the first and second readers ($CTS^{1,2}(0°)$) equal to about 0.28 TP, the CTS between the first and third readers)) ($CTS^{1,3}(0°)$) equal to 0 TP, and the CTS between the second and third readers ($CTS^{2,3}(0°)$) equal to −0.28 TP. In this configuration, the first and third readers 804, 808 are positioned over the centerline 810 of track 2 and second reader 806 is positioned over a boundary between tracks 2 and 3. In a third exemplary zone configuration 814, the skew angle is 16 degrees, making the CTS between the first and second readers ($CTS^{1,2}(16°)$)

equal to about 0.68 TP, the CTS between the first and third readers ($CTS^{1,3}(16°)$) equal to about 0.85 TP, and the CTS between the second and third readers ($CTS^{2,3}(16°)$) equal to about 0.18 TP. In this configuration, the first reader 804 is positioned over a center of track 1 and the second and third readers 806, 808 are positioned over the centerline 810 of track 2.

Plots 820, 822 and 824 in graph 818 of FIG. 8 show exemplary CTS variations between combinations of the first and second readers (r1+r2), the first and third readers (r1+r3), and the second and third readers (r2+r3), respectively, as a function of skew angle θ. As apparent from graph 818, the exemplary configuration of the CTS and DTS of the ARMR head shown in FIG. 8 supports detection of a single track (ARMR MISO mode), track 2, using all three readers, requiring three AFEs, and also supports detection of a single track (track 2) using two out of the three readers, requiring only two AFEs, over a prescribed range of skew angles |θ|≤16 degrees.

Specifically, for an exemplary ARMR MISO embodiment, assume that a target CTS range 826 from −0.2 TP to 0.2 TP is desired between any combination of two readers over a skew angle range of ±16 degrees (i.e., $|CTS|^{i,j}(θ)|<0.2$ TP for |θ|≤16°, where i and j are integers indicative of reader numbers—first, second or third readers). For skew angles between −16 degrees and about −4 degrees, a combination including the first and second readers 804, 806 is selected, since the CTS between the first and second readers falls within the desired target range 826 (see plot 820); similarly, the CTS between the first and third readers or between the second and third readers falls outside the target range 826 for skew angles between −16 and −4 degrees (i.e., −16°≤θ<−4°). For skew angles between about −4 degrees and about 4 degrees (i.e., −4°≤θ<4°), a combination including the first and third readers 804, 808 is selected, since the CTS between the first and third readers falls within the desired target range 826 (see plot 822); similarly, the CTS between the first and second readers or between the second and third readers falls outside the target range 826 for skew angles between −4 and 4 degrees. For skew angles between about 4 degrees and 16 degrees (i.e., 4°≤θ≤16°), a combination including the second and third readers 806, 808 is selected, since the CTS between the second and third readers falls within the desired target range 826 (see plot 824); similarly, the CTS between the first and second readers or between the first and third readers falls outside the target range 826 for skew angles between 4 and 16 degrees.

Figure 9:
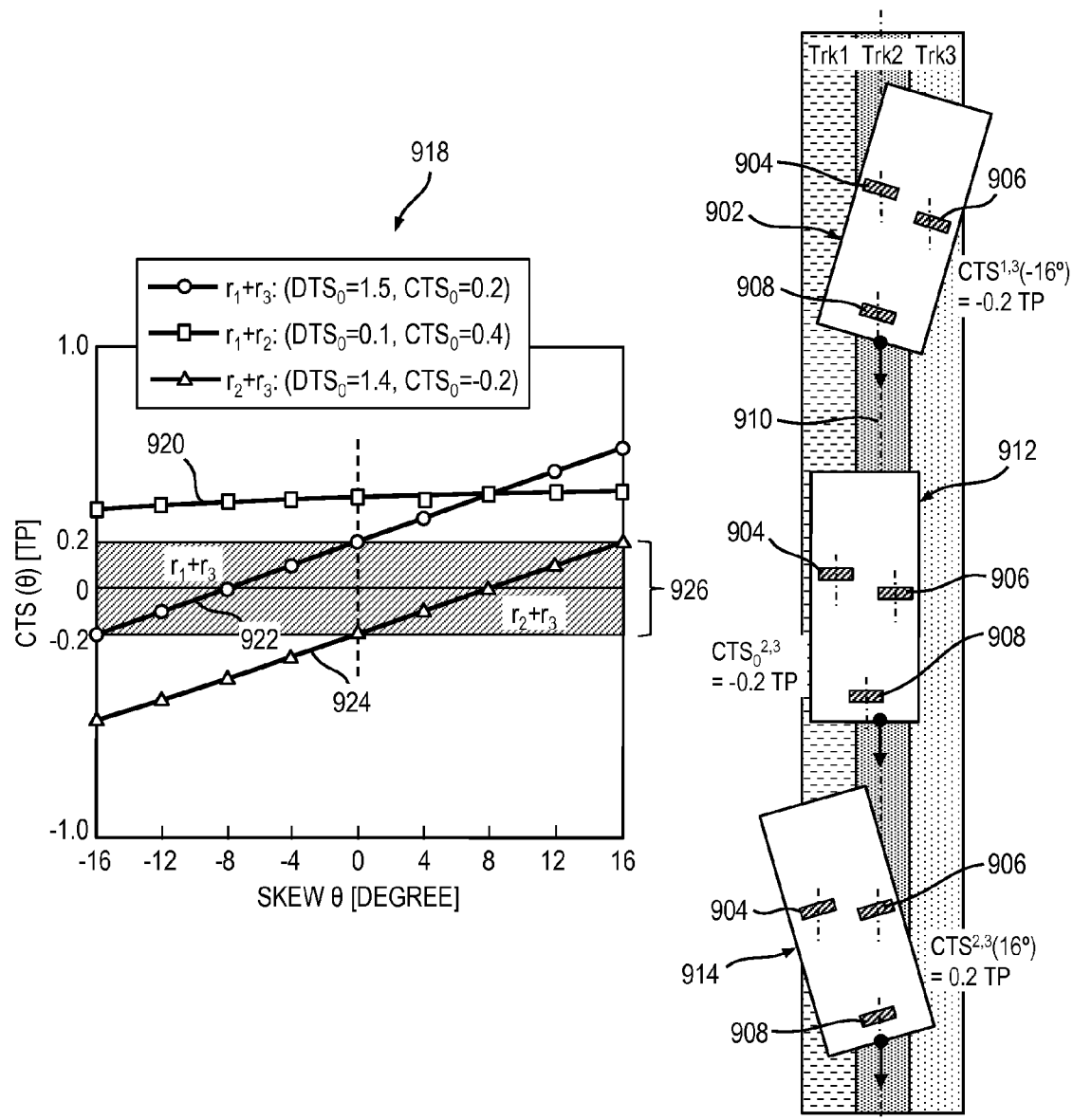
FIG. 9 depicts an illustrative methodology for configuring the DTS and CTS among readers as a function of skew angle given a second exemplary placement of readers in a multi-reader ARMR head configured for MISO operation, according to an embodiment of the invention.

FIG. 9 depicts an illustrative methodology for configuring the DTS and CTS among readers as a function of skew angle given a second exemplary placement of readers in a multi-reader ARMR head configured for MISO operation, according to an embodiment of the invention. With reference to FIG. 9, a multi-reader head comprising a first reader 904, a second reader 906 and a third reader 908 is shown in three different skew angle (zone) configurations, 902, 912 and 914. At zero skew (i.e., θ=0°), the CTS between the first and second readers ($CTS_0^{1,2}$) is 0.4 TP, the DTS between the first and second readers ($DTS_0^{1,2}$) is 0.1 TP, the CTS between the first and third readers ($CTS_0^{1,3}$) is 0.2 TP, the DTS between the first and third readers ($DTS_0^{1,3}$) is 1.5 TP, the CTS between the second and third readers ($CTS_0^{2,3}$) is −0.2 TP, and the DTS between the second and third readers ($DTS_0^{2,3}$) is 1.4 TP.

In a first exemplary zone configuration 902, the skew angle is −16 degrees, making the CTS between the first and second readers ($CTS^{1,2}(−16°)$) equal to about 0.36 TP, the CTS between the first and third readers ($CTS^{1,3}(−16°)$) equal to about −0.2 TP, and a CTS between the second and third readers ($CTS^{2,3}(−16°)$) equal to about −0.6 TP. In this configuration, the first and third readers 904, 908 are positioned over a centerline 910 of a track being read (track 2) and the second reader 906 is positioned over a center of an adjacent track (track 3). In a second exemplary zone configuration 912, the skew angle is 0 degrees, making the CTS between the first and second readers ($CTS^{1,2}(0°)$) equal to 0.4 TP, the CTS between the first and third readers) ($CTS^{1,3}(0°)$) equal to 0.2 TP, and a CTS between the second and third readers ($CTS^{2,3}(0°)$) equal to −0.2 TP, as previously stated. In this configuration, the first reader 904 is positioned over a center of track 1, and second and third readers 906, 908 are positioned on either side of the centerline 910 of track 2 but still within the boundaries of track 2. In a third exemplary zone configuration 914, the skew angle is 16 degrees, making the CTS between the first and second readers ($CTS^{1,2}(16°)$) equal to about 0.4 TP, the CTS between the first and third readers ($CTS^{1,3}(16°)$) equal to about 0.6 TP, and a CTS between the second and third readers ($CTS^{2,3}(16°)$) equal to 0.2 TP. In this configuration, the first reader 904 is positioned just off the center of track 1 and the second and third readers 906, 908 are positioned on over the centerline 910 of track 2.

Plots 920, 922 and 924 in graph 918 of FIG. 9 show exemplary CTS variations between combinations of the first and second readers (r1+r2), the first and third readers (r1+r3), and the second and third readers (r2+r3), respectively, as a function of skew angle θ. As apparent from graph 918, the exemplary configuration of the CTS and DTS of the ARMR head shown in FIG. 9 supports detection of a single track (ARMR MISO mode), track 2, using all three readers, requiring three AFEs, and also supports detection of a single track (track 2) using two out of the three readers, requiring only two AFEs, over a prescribed range of skew angles |θ|≤16 degrees.

Specifically, for an exemplary ARMR MISO embodiment, assume that a target CTS range 926 from −0.2 TP to 0.2 TP is desired between any combination of two readers over a skew angle range of ±16 degrees (i.e., $|CTS|^{i,j}(θ)|<0.2$ TP for |θ|≤16°, where i and j are integers indicative of reader numbers—first, second or third readers). For skew angles between −16 degrees and 0 degrees, a combination including the first and third readers 904, 908 is selected, since the CTS between the first and third readers falls within the desired target range 926 (see plot 922); similarly, the CTS between the first and second readers or between the second and third readers falls outside the target range 926 for skew angles between −16 and 0 degrees (i.e., −16°≤θ<0°). For skew angles between 0 degrees and 16 degrees (i.e., 0°≤θ≤16°), a combination including the second and third readers 906, 908 is selected, since the CTS between the second and third readers remains within the desired target CTS range 926 (see plot 924) for this skew angle range; similarly, the CTS between the first and second readers or between the first and third readers falls outside the target range 926 for skew angles between 0 and 16 degrees. Note, that the combination of the first and second readers does not exhibit a CTS that falls within the desired target CTS range of −0.2 TP to 0.2 TP for skew angles of |θ|≤16°.

As depicted, for example, in the illustrative embodiments shown in FIGS. 5 through 9, a location of the readers in the multiple-reader array head can be configured, based on the DTS and CTS of the readers, among other factors, such that at least one reader is aligned with a corresponding target track to be read over a prescribed range of skew angles (i.e., zones). For instance, in the case of MISO operation, at least one reader is aligned with the single target track being read, and the remaining readers, regardless of whether or not they are aligned with the target track, provide information which beneficially enhances read performance, such as, for example, by improving SNR, over all of the prescribed zones. Similarly, in the case of MIMO operation, at least two of the readers are aligned with a corresponding target track being read, and the remaining reader is used to enhance read performance.

Figure 10:
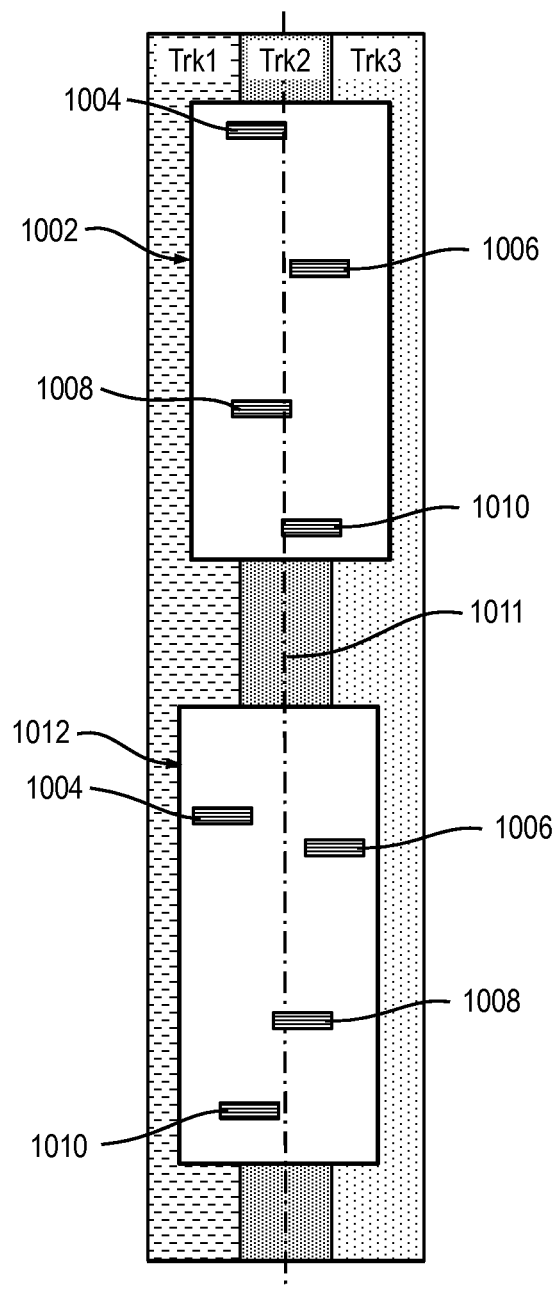
FIG. 10 is a top plan view depicting exemplary configurations of a read head comprising four readers in a zero-skew position relative to a corresponding magnetic storage medium, according to one or more embodiments of the invention.

It is to be appreciated that, although described herein in the context of a multi-reader head including three readers, techniques according to embodiments of the invention can be extended to multi-reader heads comprising more than three readers. By way of illustration only and without limitation, FIG. 10 is a top plan view depicting exemplary configurations of a read head comprising four readers in a zero-skew position relative to a corresponding magnetic storage medium, according to one or more embodiments of the invention. More particularly, with reference to FIG. 10, a multi-reader head according to an embodiment of the invention comprises four readers, 1004, 1006, 1008 and 1010; two readers (e.g., 1004 and 1008) placed on one side of a centerline 1011 of the head and two readers (e.g., 1006 and 1010) placed on an opposite side of the centerline of the head in a cross-track direction. Although FIG. 10 depicts two different arrangements of the readers, namely, configurations 1002 and 1012, each configuration characterized by prescribed cross-track and down-track distances between the readers, it is to be understood that embodiments of the invention are not limited to any specific arrangement of the readers.

The description herein of illustrative embodiments of the invention comprising three readers essentially focused on selecting a more optimal combination of two or more readers among the plurality of readers which provides higher amplitude read signals in comparison to the other reader combinations. In one or more embodiments, clustered readers (or more aligned readers) are located for a target track(s), while a lesser number of readers are used for secondary ITI suppression. As previously explained, the combination of readers selected is dependent upon the zone being read, which will thereby affect the skew angle of the array reader, and the DTS and CTS configuration of the readers, among other factors. This is due, at least in part, to the fact that the amplitude of the read signal provided by a given reader is generally proportional to an alignment of the given reader with a corresponding track being read. Thus, for example, a reader that is positioned off-center (in a cross-track direction) with respect to a corresponding target track will generate an output signal having a lower amplitude compared to a reader that is positioned over the center of the target track.

While acknowledging that there may be a given reader which provides a higher amplitude output signal among the plurality of readers for a specific CTS and DTS configuration of the read head and/or zone being read, the remaining readers which are not as optimally positioned relative to a corresponding track being read can still provide beneficial information for enhancing read performance, such as, for example, by increasing SNR, to thereby improve skew tolerance in the ARMR system. In one or more embodiments, the read signals from all of the readers are processed by a joint equalizer, with the joint equalizer configured to assign weights to the read signals as a function of the respective amplitudes of the read signals. In this manner, the reader having the largest amplitude signal among the plurality of readers, indicative of a more optimal alignment of the reader relative to a corresponding target track being read, is given a higher weight in determining the logical state of the information read from the target track. This higher weight attributable to a given reader correlates to a higher probability that the data decoded from the reader signal correctly matches the data stored on the target track being read.

Regardless of the particular arrangement of readers in the multi-reader head, embodiments of the invention dynamically change the weights assigned to the respective readers, which in turn affects which reader or readers are utilized for primary forward processing, as a function of the skew angle and CTS between readers. In this manner, embodiments of the invention achieve enhanced skew tolerance in the ARMR system for both MISO and MIMO modes of operation compared to alternative approaches which employ a fixed reader configuration.

Although embodiments of the invention are not limited to any specific arrangement of the readers, for a three-reader head, arrangements in which the second reader (i.e., the middle reader, in a down-track direction) is placed on one side of a centerline of the head and the first and third readers are placed on an opposite side of the centerline (in a cross-track direction) provide favorable performance over a wide range of skew angles. In the general case, a multi-reader head is configured, according to one or more embodiments, such that for at least a subset of the plurality of readers in the multi-reader head, adjacent readers are located on opposite sides (in a cross-track direction) of a centerline of the multi-reader head, the centerline being oriented in a down-track direction (perpendicular to the cross-track direction). According to one or more embodiments, the multi-reader head is configured such that at zero skew, CTS and DTS between readers are appropriate for a desired mode of operation in the ARMR system (e.g., MISO or MIMO operation).

As previously stated, a determination as to which of the readers is used for primary forward processing in reading data stored on a corresponding track of a magnetic storage medium is based, at least in part, on skew angle, which varies as a function of the particular zone of the medium being read, and the CTS between respective readers. The CTS between readers is often specified by a manufacturer based on prescribed design criteria, although the CTS may vary due to manufacturing tolerances and environmental characteristics (e.g., temperature, vibration, etc.), among other factors. CTS information for the readers may be obtained from manufacturer specifications, according to one or more embodiments. In one or more alternative embodiments, CTS information for the readers is estimated using known CTS estimation techniques. In accordance with one or more embodiments, CTS information for the readers is estimated from read-back signal processing, such as may be performed during a calibration operation.

Once the CTS information for the readers is determined as a function of skew angle for a prescribed range of skew angles (e.g., about ±16 degrees), reader combinations providing more optimal read performance in comparison to other combinations of readers for a given skew angle are pre-computed and stored (e.g., in a zone table or other storage element) for each zone of the medium to be read. Performance may be computed, according to one or more embodiments, as a function of measured amplitudes of the corresponding read signals obtained from each combination of readers, for example. During read-back, the stored reader combination corresponding to a given zone in which the multi-reader head is operating is selected for further processing.

Shingled magnetic recording (SMR) is a known technique for achieving higher areal densities by essentially squeezing tracks closer together; tracks overlap one another, like shingles on a roof, allowing more data to be written to the same space. As new data is written, the drive tracks are trimmed, or shingled. Because the reader element on the drive head is smaller than the writer, all data can still be read off the trimmed track without compromise to data integrity or reliability. In addition, traditional reader and writer elements can be used for SMR. By way of example only and without limitation, for an ARMR-MISO system using SMR in accordance with one or more embodiments of the invention, positioning the primary or clustered readers on the center of the target track while locating the secondary readers on the side of the shingling track is preferred for performance.

Figure 11:
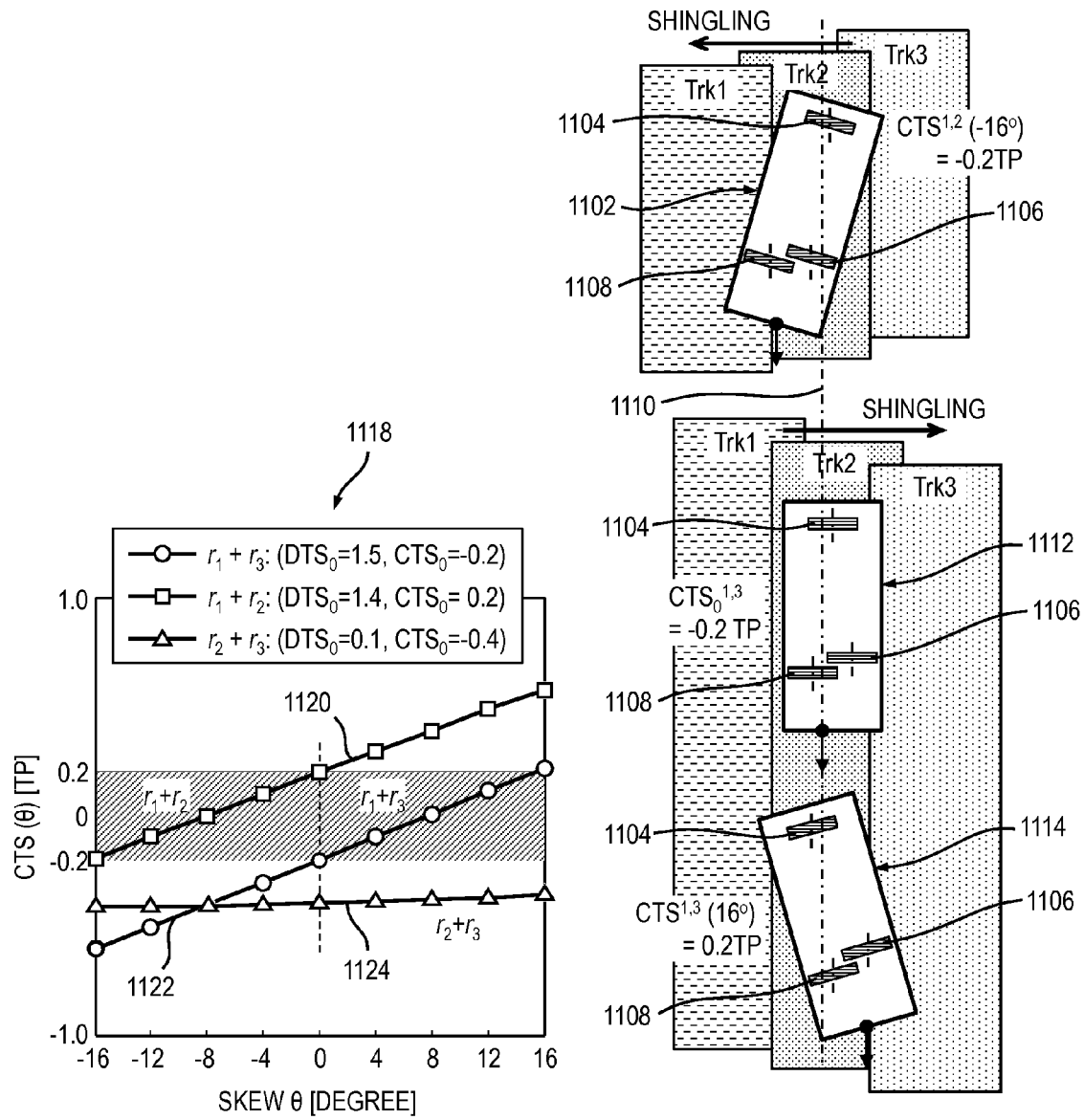
FIG. 11 conceptually depicts an illustrative arrangement for configuring the DTS and CTS among readers as a function of skew angle given an exemplary placement of readers in a multi-reader ARMR head configured for MISO operation using shingled magnetic recording (SMR), according to an embodiment of the invention.

FIG. 11 conceptually depicts an illustrative arrangement for configuring the DTS and CTS among readers as a function of skew angle given an exemplary placement of readers in a multi-reader ARMR head configured for MISO operation using SMR, according to an embodiment of the invention. With reference to FIG. 11, a multi-reader head comprising a first reader 1104, a second reader 1106 and a third reader 1108 is shown in three different skew angle (zone) configurations, 1102, 1112 and 1114. At zero skew (i.e., $\theta=0°$), the CTS between the first and second readers ($CTS_0^{1,2}$) is 0.2 TP, the DTS between the first and second readers ($DTS_0^{1,2}$) is 1.4 TP, the CTS between the first and third readers ($CTS_0^{1,3}$) is $-0.2$ TP, the DTS between the first and third readers ($DTS_0^{1,3}$) is 1.5 TP, the CTS between the second and third readers ($CTS_0^{2,3}$) is $-0.4$ TP, and the DTS between the second and third readers ($DTS_0^{2,3}$) is 0.1 TP.

In a first exemplary zone configuration 1102, the skew angle is $-16$ degrees, making the CTS between the first and second readers ($CTS^{1,2}(-16°)$) equal to about $-0.2$ TP, the CTS between the first and third readers ($CTS^{1,3}(-16°)$) equal to about $-0.6$ TP, and a CTS between the second and third readers ($CTS^{2,3}(-16°)$) equal to about $-0.4$ TP. In this configuration, the first and second readers 1104, 1106 are positioned on either side of, and closely proximate to, an effective centerline 1110 of a track being read (track 2), and the third reader 1108 is positioned over a boundary between the track being read and an adjacent track (track 1), squeezing track 2 while writing. In a second exemplary zone configuration 1112, the skew angle is 0 degrees, making the CTS between the first and second readers ($CTS^{1,2}(0°)$) equal to 0.2 TP, the CTS between the first and third readers ($CTS^{1,3}(0°)$) equal to $-0.2$ TP, and a CTS between the second and third readers ($CTS^{2,3}(0°)$) equal to $-0.4$ TP, as previously stated. In this configuration, the first and third readers 1104, 1108 are positioned on either side of, and closely proximate to, the centerline 1110 of track 2, and the second reader 1106 is positioned off the centerline 1110 but still within the boundaries of track 2, toward the squeezing adjacent track (track 3). In a third exemplary zone configuration 1114, the skew angle is 16 degrees, making the CTS between the first and second readers ($CTS^{1,2}(16°)$) equal to about 0.58 TP, the CTS between the first and third readers ($CTS^{1,3}(16°)$) equal to 0.2 TP, and a CTS between the second and third readers ($CTS^{2,3}(16°)$) equal to about $-0.35$ TP. In this configuration, the first and third readers 1104, 1108 are positioned on either side of, and closely proximate to, the centerline 1110 of track 2, and the second reader 1106 is positioned over a boundary between the track being read and an adjacent track (track 3), squeezing track 2 while writing.

A smaller overall DTS is provided using SMR, considering shingling direction. Plots 1120, 1122 and 1124 in graph 1118 of FIG. 11 show exemplary CTS variations between combinations of the first and second readers, the first and third readers, and the second and third readers, respectively, as a function of skew angle $\theta$. As apparent from graph 1118, the exemplary configuration of the CTS and DTS of the ARMR head shown in FIG. 11 supports detection of a single track (ARMR MISO mode), track 2, using all three readers, requiring three AFEs, and also supports detection of a single track (track 2) using two out of the three readers, requiring only two AFEs, over a prescribed range of skew angles $|\theta| \leq 16$ degrees; that is, $|CTS^{i,j}(\theta)| < 0.2$ TP, where i, j represent a pair of two readers and $\theta$ represents skew angle. In this embodiment, a combination of the first and second readers 1104, 1106 provides more optimal performance for skew angles $\theta$ in a range of about $-16 \leq \theta < 0$, and a combination of the first and third readers 1104, 1108 provides more optimal performance for skew angles $\theta$ in a range of about $0 \leq \theta \leq 16$.

Since the shingling directions are different for OD and ID in general, the array reader can be designed such that the preferred reader configurations can be provided at both OD and ID, or at least at the OD, yielding larger areal density gain than ID and MD.

Figure 12:
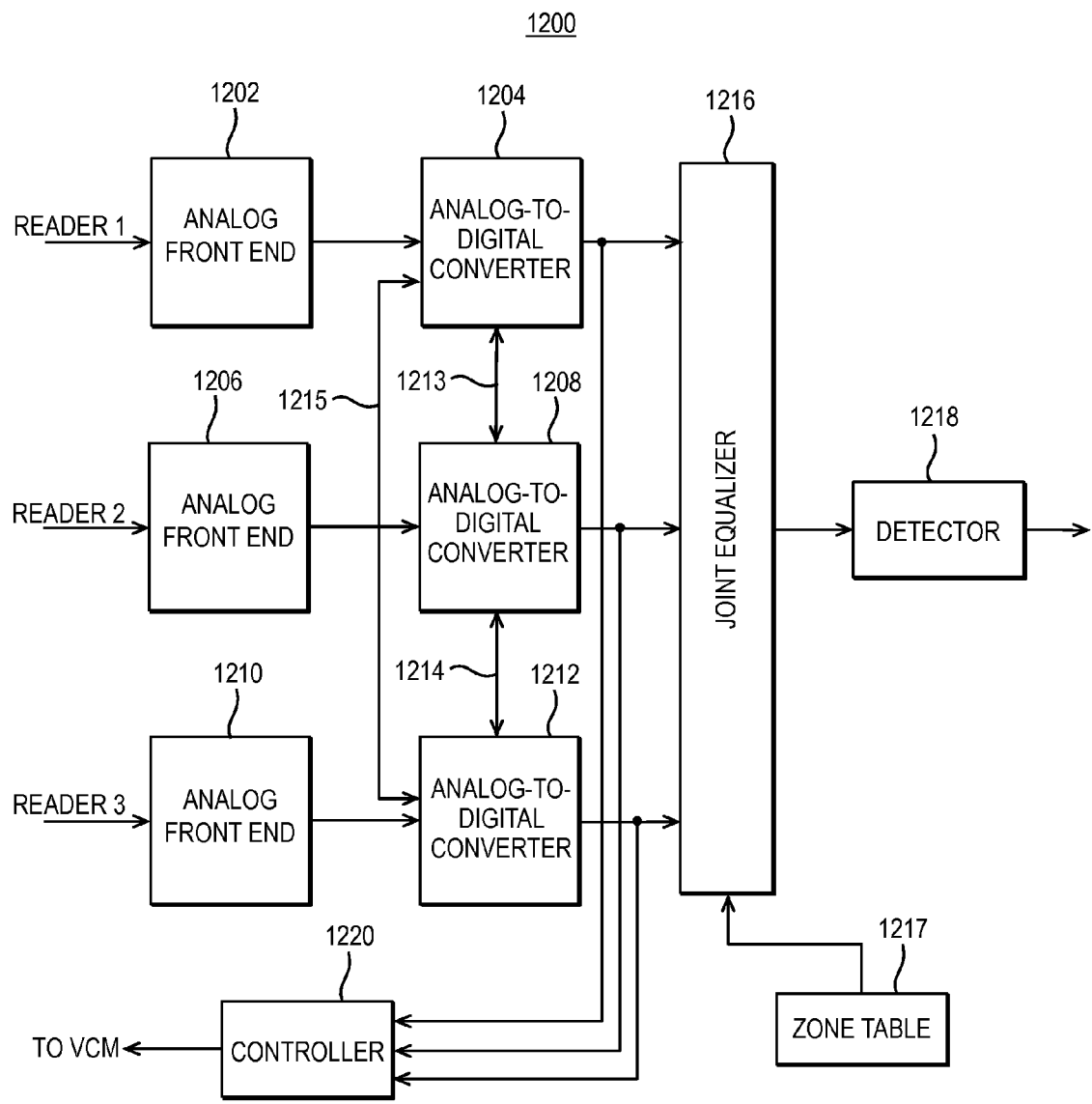
FIG. 12 is a block diagram depicting at least a portion of an exemplary read channel in which one or more embodiments of the invention are employed that is suitable for use in an ARMR system, according to an embodiment of the invention.

FIG. 12 is a block diagram depicting at least a portion of an exemplary read channel 1200 in which one or more aspects of the invention are employed that is suitable for use in a multi-reader ARMR system, according to an embodiment of the invention. The read channel 1200, in this embodiment, is adapted for use in conjunction with a multi-reader head comprising three readers and is operative to process signals from all three readers, although embodiments of the invention are not limited to use with a read channel comprising three read signal paths.

The read channel 1200 includes a first read signal path comprising a first analog front end (AFE) 1202 and a first analog-to-digital converter (ADC) 1204 connected in series with the first AFE, a second read signal path comprising a second AFE 1206 and a second ADC 1208 connected in series with the second AFE, and a third read signal path comprising a third AFE 1210 and a third ADC 1212 connected in series with the third AFE. It is to be understood that embodiments of the invention are not limited to using three readers, as previously explained.

Each of the first, second and third AFEs 1202, 1206 and 1210 is configured to receive a read signal from a corresponding one of the readers, namely, reader 1, reader 2 and reader 3, respectively, either directly from the corresponding reader in an unamplified form (in which case each of the AFEs optionally includes a preamplifier or other amplification circuitry) or from a preamplifier (not explicitly shown, but implied) coupled in a signal path between each of the first, second and third AFEs and a corresponding one of the readers, and to generate a first analog read signal as an output thereof. Each of the AFEs 1202, 1206, 1210 may, in one or more embodiments, include signal processing circuitry (e.g., filters, etc.) for reducing noise or otherwise improving a quality of the analog read signals generated by the respective from the corresponding readers. Each of the AFEs 1202, 1206, 1210, in one or more embodiments, provides biasing for a magnetic sensor in the corresponding reader.

The first ADC 1204 is configured to receive the first analog read signal generated by the first AFE 1202 and to generate, as a function of the first analog read signal, a first digital read signal. The first digital read signal is a digitized (i.e., sampled) version of the first analog read signal, sampled at prescribed discrete time intervals based on a sampling period of the first ADC. Likewise, the second ADC 1208 is configured to receive the second analog read signal generated by the second AFE 1206 and to generate, as a function of the second analog read signal, a second digital read signal. The second digital read signal is a digitized version of the second analog read signal, sampled at prescribed discrete time intervals based on a sampling period of the second ADC. The third ADC 1212 is configured to receive the third analog read signal generated by the third AFE 1210 and to generate, as a function of the third analog read signal, a third digital read signal. The third digital read signal is a digitized version of the third analog read signal, sampled at prescribed discrete time intervals based on a sampling period of the third ADC. In one or more embodiments, the sampling periods of the first, second and third ADCs are the same, although embodiments of the invention contemplate that one or more of the sampling periods may be different.

In one or more embodiments, the first, second and third ADCs 1204, 1208 and 1212, respectively, are configured to exchange information with one another or otherwise function together jointly, as represented by connection 1213 between the first and second ADCs, connection 1214 between the second and third ADCs, and connection 1215 between the first and third ADCs. For example, reader 1 can be configured as a primary reader and readers 2 and 3 can be sampled by the phase of reader 1. Alternatively, the outputs of the first, second and third AFEs 1202, 1206 and 1210, respectively, can be sampled jointly; that is, by a joint ADC (not explicitly shown but represented functionally by ADCs 1204, 1208 and 1212) configured to receive, as inputs, the respective outputs of the three AFEs and to generate corresponding ADC outputs.

The read channel 1200 further comprises a joint equalizer module 1216 configured to receive the first digital read signal generated by the first ADC 1204, the second digital read signal generated by the second ADC 1208, and the third digital read signal generated by the third ADC 1212, and is configured to generate an equalized output signal which is used to equalize input read signals (i.e., read pulses), to facilitate making a determination regarding a digital state (e.g., logic "1" or "0") of a target track or tracks being read, and to decode the read data as a function of the first, second and third input read signals. The determination regarding the digital state of the information read from the target track(s) can be in the form of a hard decision (e.g., a logic "0" or "1") or a soft decision (e.g., a probability relating to a particular logical state of the information read from the target track).

As previously stated, the read signals from all of the readers are processed by the joint equalizer module 1216, with the joint equalizer module configured to assign prescribed weights to the respective read signals as a function of the corresponding amplitudes of the read signals. Thus, a given reader generating a read signal having the largest amplitude among the plurality of readers, which is indicative of a more optimal alignment of the given reader relative to a corresponding target track being read, is assigned a higher weight in determining the logical state of the information read from the corresponding target track. This higher weight attributable to a given reader correlates to a higher probability that the data decoded from the reader signal correctly matches the data stored on the target track being read. In this manner, embodiments of the invention enable a reader (or readers) that may not otherwise be optimally aligned with a corresponding target track being read to still provide some beneficial information in determining the final output result, including increasing SNR, crosstalk cancellation, etc., to provide enhanced read performance and thereby improve skew tolerance in the ARMR system.

In accordance with one or more embodiments, a zone table 1217 coupled with the joint equalizer module 1216 is used to store pre-computed weight assignments for each of the readers corresponding to reader performance as a function of each zone of the medium to be read. The pre-computed weight assignments are based, at least in part, on the CTS information for the readers, which is determined as a function of skew angle for a prescribed range of skew angles (e.g., ±16 degrees). Performance may be computed, in one or more embodiments, as a function of measured amplitudes of the corresponding read signals obtained from each of readers. During read-back, the stored reader weight assignments corresponding to a given zone are retrieved from the zone table 1217 by the joint equalizer module 1216, and these weight assignments are then used by the joint equalizer module in decoding the data read from the target track, in a MISO mode of operation, or tracks, in a MIMO mode of operation. In accordance with one or more embodiments, the prescribed weights assigned to the readers are updated (e.g., at prescribed time intervals, on-the-fly, etc.) as the zone (and hence the skew angle) in which the multi-reader head is operating changes.

The read channel 1200 further comprises a detector 1218 coupled with the joint equalizer 1216. The detector 1218 is configured to receive the equalized output signal generated by the joint equalizer 1216 and to generate a decoded output signal indicative of a logical state of the target track or tracks being read. The detector 1218 is operative to generate the output signal as a function of the prescribed weights assigned to the corresponding read signals obtained from each of readers.

Optionally, a controller 1220 is included in the read channel 1200. The controller 1220 is operative to position the plurality of readers (e.g., readers 1 through 3) in the multi-reader head (not explicitly shown but implied) such that each target track is aligned with at least one of the readers for each of the zones in which the multi-reader head is operating. The controller 1220, in one or more embodiments, is configured to receive a read signal, or a signal indicative thereof, from each of the readers and to generate a control signal supplied to a VCM, or alternative head positioning means, for locating the readers relative to their corresponding target tracks as a function of the CTS and DTS of the readers, as well as the skew angle of the multi-reader head.

As will be appreciated by those skilled in the art, embodiments of the present invention may be implemented as an apparatus, system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, embodiments of the present invention may take the form of a computer program product embodied in one or more non-transitory machine-readable medium(s) having machine-readable program code embodied thereon.

One or more embodiments of the invention, or elements thereof, can be implemented in the form of an apparatus including a memory and at least one processor coupled with the memory and operative to perform exemplary method steps.

Figure 13:
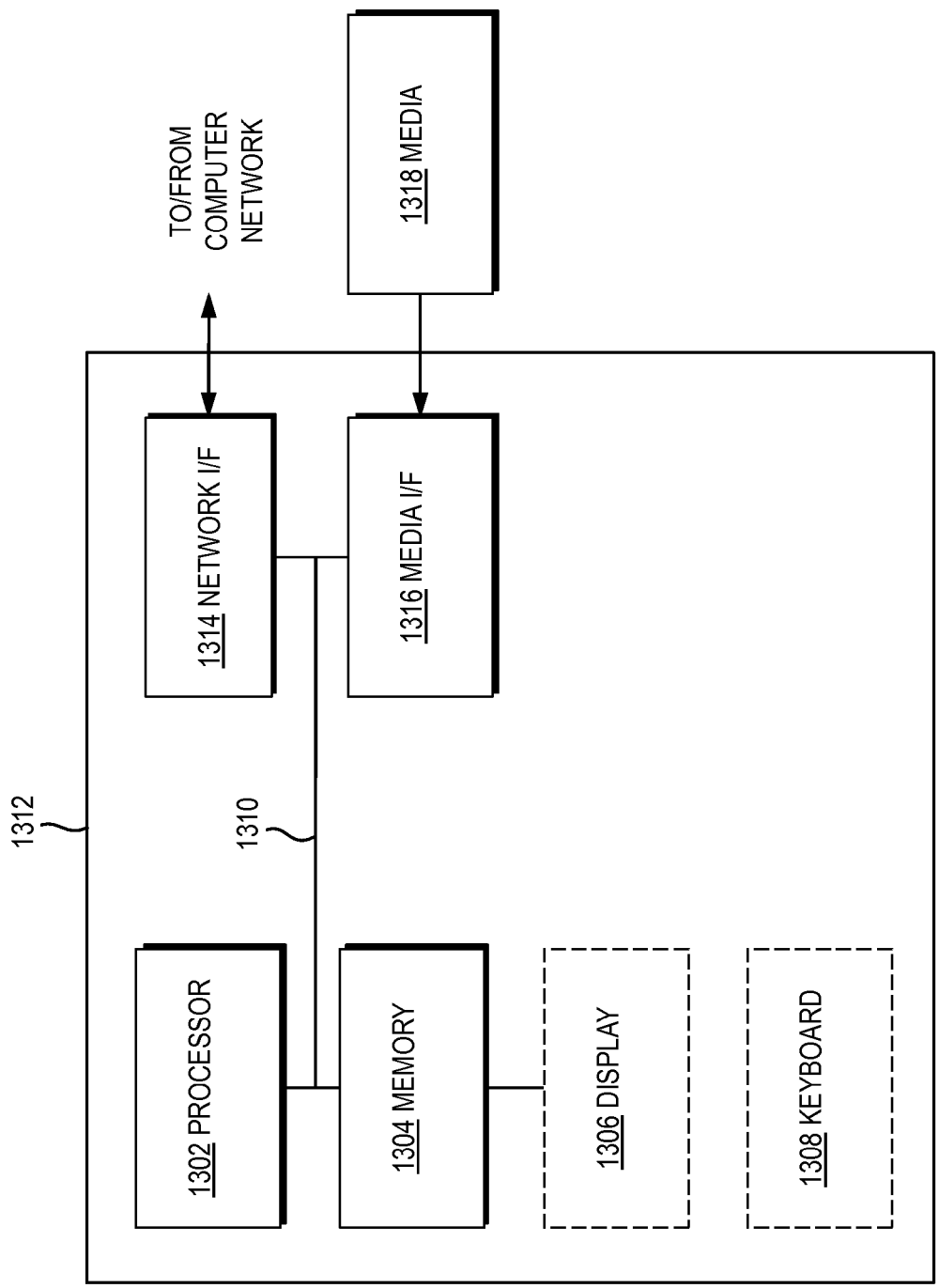
FIG. 13 depicts a computer system that may be useful in implementing one or more embodiments and/or elements of the invention.

One or more embodiments of the invention make use of software running on a general purpose computer or workstation which, when configured by the software, becomes a special purpose machine operative to perform methods in accordance with embodiments described herein. With reference to FIG. 13, such an implementation might employ, for example, a processor 1302, a memory 1304, and an input/output interface formed, for example, by a display 1306 and a keyboard 1308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1302, memory 1304, and input/output interface such as display 1306 and keyboard 1308 can be interconnected, for example, via bus 1310 as part of a data processing unit 1312. Suitable interconnections, for example via bus 1310, can also be provided to a network interface 1314, such as a network card, which can be provided to interface with a computer network, and to a media interface 1316, such as a diskette or CD-ROM drive, which can be provided to interface with media 1318.

Accordingly, computer software including instructions or code for performing methodologies according to embodiments of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1302 coupled directly or indirectly with memory elements 1304 through a system bus 1310. The memory elements can include local memory employed during actual implementation of the program code, bulk storage, cache memories and embedded memory which provide temporary storage of at least a portion of program code in order to reduce the number of times the code must be retrieved from bulk storage during implementation.

Input/output or I/O devices (including but not limited to keyboards 1308, displays 1306, pointing devices, and the like) can be coupled to the system either directly (such as via bus 1310) or through intervening I/O controllers (omitted for clarity).

Network adapters such as network interface 1314 are also coupled with the system, in one or more embodiments of the invention, to enable the data processing system to become coupled with other data processing systems or remote printers or storage devices through intervening private or public networks. Modems, cable modem and Ethernet cards are just a few of the currently available types of network adapters.

As noted, one or more embodiments of the present invention may take the form of a computer program product embodied in one or more non-transient machine- or computer-readable medium(s) having computer-readable program code embodied thereon. Any combination of one or more computer-readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1318 is a non-limiting example. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In one or more embodiments, a computer-readable storage medium is any tangible medium that can contain or store a program for use by or in connection with an instruction execution system, apparatus, or device.

Computer program code for carrying out operations according to one or more embodiments of the invention are written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program code, in one or more embodiments, is loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing functions/acts specified in the flowchart and/or block diagram block or blocks.

The block diagrams in the figures depict illustrative architectures, functionality, and operation of implementations of systems, methods and computer program products according to embodiments of the present invention. In this regard, each block shown in the block diagrams may represent a module, segment, or portion of code, which comprises one or more executable instructions for implementing specified functions. It should also be noted that, in one or more embodiments, functions represented by the blocks may occur out of the order noted in the figures. For example, two blocks shown in succession may, in fact, be executed substantially concurrently, or the blocks may sometimes be executed in the reverse order, depending upon the functionality involved. It will also be appreciated that each block of the block diagrams, and combinations of blocks in the block diagrams, can be implemented by special purpose hardware-based systems that perform the specified functions or acts, or combinations of special purpose hardware and computer instructions.

It should be understood that any of the methods described herein can include an additional step of providing a system comprising distinct software modules embodied on a non-transient computer-readable storage medium; the modules include, in one or more embodiments, any or all of the elements depicted in the block diagrams and/or described herein; by way of example and not limitation, a joint equalization module and a detection module. The method steps can then be carried out using the distinct software modules and/or sub-modules of the system, executing on one or more hardware processors 1302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICs), functional circuitry, one or more appropriately programmed general purpose digital computers with associated memory, and the like. Given the teachings of the invention provided herein, one of ordinary skill in the related art will be able to contemplate other implementations of the components of the invention.

In an integrated circuit implementation of one or more embodiments of the invention, multiple identical die are typically fabricated in a repeated pattern on a surface of a semiconductor wafer. Each such die may include a device described herein, and may include other structures and/or circuits. The individual dies are cut or diced from the wafer, then packaged as integrated circuits. One skilled in the art would know how to dice wafers and package die to produce integrated circuits. Any of the exemplary circuits illustrated in the accompanying figures, or portions thereof, may be part of an integrated circuit. Integrated circuits so manufactured are considered part of this invention.

Figure 14:
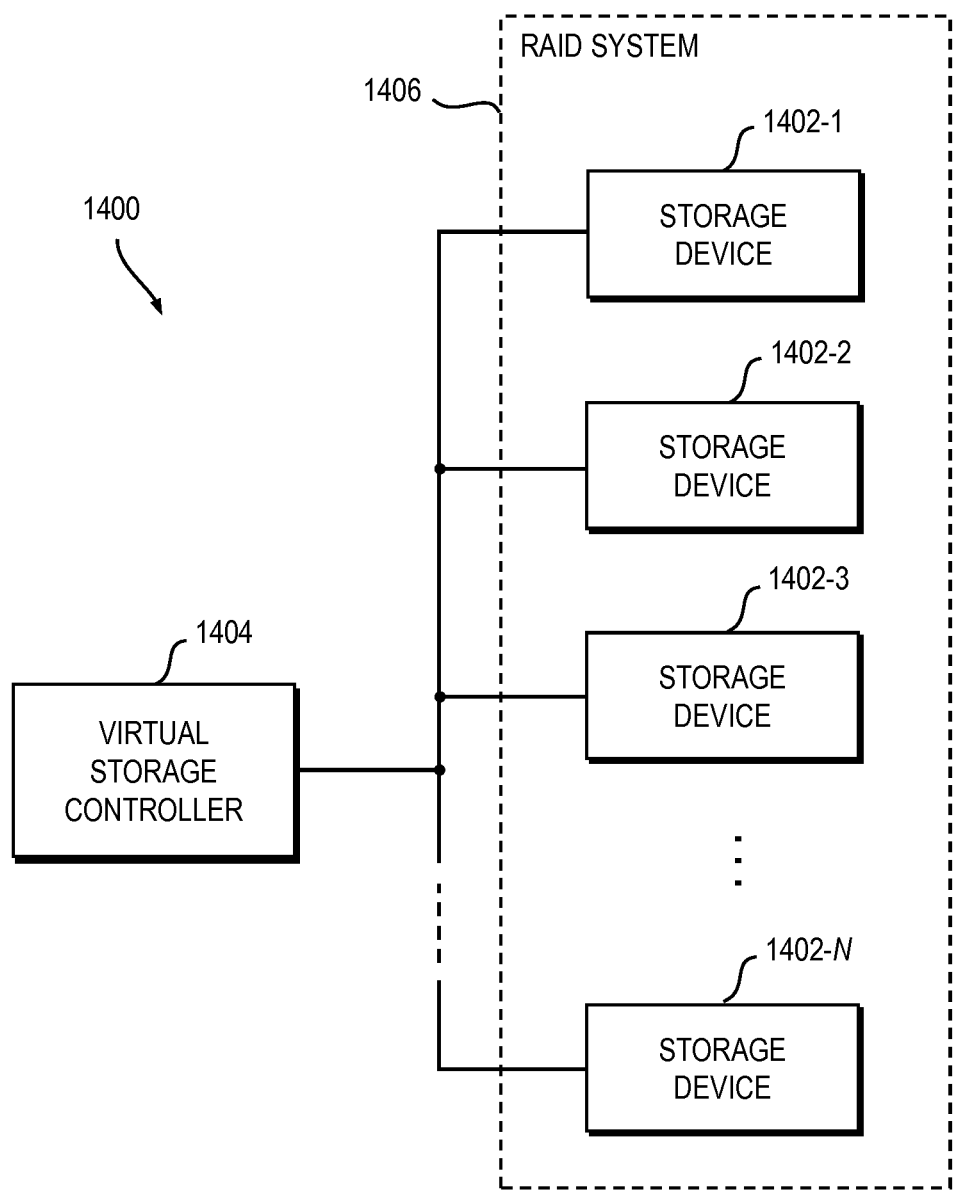
FIG. 14 is a block diagram depicting at least a portion of an exemplary virtual storage system comprising multiple storage devices, at least one of the storage devices incorporating techniques for enhancing skew tolerance in a multi-reader ARMR environment, according to an embodiment of the invention.

Embodiments of the invention are suitable for use in conjunction with a virtual storage system 1400 comprising multiple storage devices 1402-1 through 1402-N, possibly of multiple different types, as illustrated in FIG. 14. For example, the storage devices 1402-1 through 1402-N may be implemented using all hard disk drives (HDDs), all solid-state drives (SSDs), or using a combination of one or more HDDs and one or more SSDs. Other storage device types are similarly contemplated. The virtual storage system 1400, also referred to as a storage virtualization system, illustratively comprises a virtual storage controller 1404 coupled with a redundant array of independent devices (RAID) system 1406. As will be known by those skilled in the art, RAID is a storage technology that provides increased reliability, among other features, through redundancy. This is accomplished by combining multiple physical storage components (e.g., HDDs, SSDs, etc.) into a logical (i.e., virtual) unit, where data is distributed across the multiple storage components in one of a plurality of ways, generally referred to as "RAID levels." The RAID system 1406 more specifically comprises N distinct storage devices denoted 1402-1, 1402-2, . . . 1402-N, where N is an integer greater than one. As previously stated, all storage devices 1402-1 through 1402-N need not be of the same type. Furthermore, one or more of the storage devices 1402-1 through 1402-N of the RAID system 1406 are assumed to be configured to include apparatus and/or circuitry as disclosed herein. These and other virtual storage systems comprising multiple storage devices (e.g., HDDs, SSDs, or some combination of HDDs and SSDs), are considered embodiments of the invention.

The illustrations of embodiments of the invention described herein are intended to provide a general understanding of the structure of various embodiments, and they are not intended to serve as a complete description of all the elements and features of apparatus and systems that might make use of the structures described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Written Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Written Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A method for enhancing read performance in an array reader magnetic recording (ARMR) system, the method comprising:
    obtaining cross-track separation (CTS) information for a plurality of readers in a multireader head of the ARMR system, the CTS information defining a relationship between skew angle and CTS between respective combinations of subsets of the plurality of readers;
    determining, as a function of the CTS information, a subset of the plurality of readers which provides enhanced read performance among a total number of the plurality of readers for each of a plurality of skew angles;
    assigning a weight value to each of a plurality of read signals generated by a corresponding one of the plurality of readers for each of the plurality of skew angles, the weight value assigned to each of the read signals being indicative of a performance of the corresponding one of the readers relative to one another; and
    decoding information read from at least one target track of a magnetic storage medium being read as a function of the plurality of read signals and corresponding weight values.

2. The method of claim 1, wherein the CTS information defines a relationship between skew angle and CTS between respective pairs of readers in a plurality of combinations of pairs of readers.

3. The method of claim 1, further comprising configuring the CTS and down-track separation (DTS) of the plurality of readers in the multi-reader head such that at least one reader is aligned over each corresponding target track of the magnetic storage medium being read for each of a plurality of skew angles.

4. The method of claim 1, further comprising configuring at least a subset of the plurality of readers in the multi-reader head such that adjacent readers are located on opposite sides, in a cross-track direction, of a centerline of the multi-reader head, the centerline being oriented in a down-track direction.

5. The method of claim 1, further comprising storing assigned weight values corresponding to each of the plurality of readers for each of at least a subset of the plurality of skew angles.

6. The method of claim 5, wherein decoding information read from the at least one target track comprises retrieving the assigned weight values corresponding to each of the plurality of readers for a given one of the plurality of skew angles corresponding to a zone of the magnetic storage medium being read.

7. The method of claim 1, wherein decoding information read from the at least one target track comprises:
  detecting a zone in which the multi-reader head is positioned over the magnetic storage medium being read; and
  changing a subset of the plurality of assigned weights as a function of the detected zone in which the multi-reader head is operating to thereby provide enhanced read performance.

8. The method of claim 1, further comprising controlling a location of the multi-reader head relative to the magnetic storage medium such that each target track being read of the storage medium is aligned with at least one corresponding reader of the multi-reader head for a given zone being read.

9. The method of claim 1, wherein determining the subset of the plurality of readers which provides enhanced read performance among the total number of readers comprises:
  determining CTS variation as a function of skew angle for each combination of subsets of the plurality of readers in the multi-reader head over a prescribed range of skew angles; and
  determining which combinations of subsets of the plurality of readers have a CTS that is within a prescribed range of CTS variation for each of at least a subset of skew angles in the prescribed range of skew angles.

10. The method of claim 9, wherein determining CTS variation for each combination of subsets of the plurality of readers comprises estimating CTS information for the readers from read-back signal processing performed during a calibration operation.

11. The method of claim 1, wherein assigning a weight value to each of the plurality of read signals comprises:
  determining whether the multi-reader head is to be used in one of a multiple-input single-output and a multiple-input multiple-output mode of operation; and
  assigning a greater weight to a given one of the combinations of subsets of the plurality of readers determined to provide enhanced read performance, relative to the plurality of readers, as a function of the mode of operation of the multi-reader head.

12. The method of claim 1, further comprising, for a shingled magnetic recording mode of operation, locating a primary subset of readers over a center of the at least one target track being read and locating a secondary subset of readers on a side of a shingling track, wherein the primary subset of readers comprises readers used for primary forward processing in reading data stored on a corresponding track of the magnetic storage medium, and the secondary subset of readers comprises readers not directly used in the primary forward processing.

13. An apparatus for enhancing read performance in a multi-reader two-dimensional magnetic recording system, the apparatus comprising:
  a plurality of analog front ends, each of the analog front ends being configured to receive a read signal from a corresponding one of a plurality of readers in a multi-reader array head of the magnetic recording system and to generate an analog signal as a function of the read signal from the corresponding one of the plurality of readers;
  a plurality of analog-to-digital converters coupled with the respective plurality of analog front ends, each of the analog-to-digital converters being configured to receive a given one of the analog signals generated by a corresponding one of the plurality of analog front ends and to generate, as a function of the given analog signal, a digital read signal; and
  a joint equalizer coupled with the plurality of analog-to-digital converters, the joint equalizer being configured to receive the respective digital read signals generated by the plurality of analog-to-digital converters and to assign a weight value to each of the respective digital read signals for each of a plurality of skew angles, the weight value assigned to each of the read signals being indicative of a performance of the corresponding one of the plurality of readers relative to one another.

14. The apparatus of claim 13, wherein each of the weight values assigned to a corresponding one of the plurality of digital read signals is determined as a function of an amplitude of the corresponding one of the plurality of digital read signals.

15. The apparatus of claim 13, further comprising a detector coupled with the joint equalizer, the detector being configured to receive an equalized output signal generated by the joint equalizer and to generate a decoded output signal indicative of a logical state of at least one target track of a magnetic medium being read, the decoded output signal being generated as a function of the prescribed weights assigned to the corresponding read signals obtained from each of readers.

16. The apparatus of claim 15, wherein the decoded output signal comprises a probability relating to the logical state of the at least one target track of the magnetic medium being read.

17. The apparatus of claim 13, wherein a cross-track separation (CTS) and down-track separation (DTS) of the plurality of readers in the multi-reader head are configured such that at least one reader is aligned over each corresponding target track of the magnetic storage medium being read for each of the plurality of skew angles.

18. The apparatus of claim 13, further comprising a zone table connected with the joint equalizer, the zone table storing the assigned weight values corresponding to the plurality of readers for each of the plurality of skew angles corresponding to a zone of the magnetic storage medium being read.

19. The apparatus of claim 13, further comprising a controller configured to receive a read signal, or a signal indicative thereof, from each of the plurality of readers and to generate a control signal for controlling a location of the plurality of readers in the multi-reader head relative to the at least one target track being read such that the at least one target track is aligned with at least one of the readers for each zone in which the multi-reader head is operating.

20. The apparatus of claim 13, wherein at least a subset of the plurality of analog-to-digital converters are configured to exchange information with one another.

21. The apparatus of claim 13, wherein at least a portion of the apparatus is fabricated in at least one integrated circuit.

22. A data storage system, comprising:
  a plurality of storage devices, wherein at least one of the plurality of storage devices comprises:
  a multi-reader array head comprising a plurality of readers;
  a plurality of analog front ends, each of the analog front ends being configured to receive a read signal from a corresponding one of the plurality of readers in the multireader array head and to generate an analog signal as a function of the read signal from the corresponding one of the plurality of readers;

a plurality of analog-to-digital converters coupled with the respective plurality of analog front ends, each of the analog-to-digital converters being configured to receive a given one of the analog signals generated by a corresponding one of the plurality of analog front ends and to generate, as a function of the given analog signal, a digital read signal; and a joint equalizer coupled with the plurality of analog-to-digital converters, the joint equalizer being configured to receive the respective digital read signals generated by the plurality of analog-to-digital converters and to assign a weight value to each of the respective digital read signals for each of a plurality of skew angles, the weight value assigned to each of the read signals being indicative of a performance of the corresponding one of the plurality of readers relative to one another.

23. The system of claim 22, further comprising a controller configured to position the plurality of readers in the multi-reader head such that each target track of a magnetic storage medium being read is aligned with at least one of the plurality of readers for each zone in which the multi-reader head is operating.

* * * * *